United States Patent [19]

Gallagher

[11] Patent Number: 4,933,912
[45] Date of Patent: Jun. 12, 1990

[54] THREE DIMENSIONAL SEISMIC PROSPECTING METHOD

[75] Inventor: Joseph G. Gallagher, Bartlesville, Okla.

[73] Assignee: Phillips Petroleum Company, Bartlesville, Okla.

[21] Appl. No.: 393,430

[22] Filed: Aug. 11, 1989

[51] Int. Cl.⁵ ............................................... G01V 1/28
[52] U.S. Cl. ......................................... 367/59; 367/56
[58] Field of Search ................... 367/56, 58, 59, 60, 367/37, 73; 364/421

[56] References Cited

U.S. PATENT DOCUMENTS

| | | | |
|---|---|---|---|
| 4,330,873 | 5/1982 | Peterson | 367/60 |
| 4,476,552 | 10/1984 | Waters et al. | 367/56 |
| 4,573,148 | 2/1986 | Herkenhoff et al. | 367/47 |
| 4,672,545 | 6/1987 | Lin et al. | 364/421 |
| 4,727,488 | 2/1988 | Flinchbaugh | 364/421 |
| 4,742,497 | 5/1988 | Beasley et al. | 367/52 |

Primary Examiner—Thomas H. Tarcza
Assistant Examiner—Ian J. Lobo
Attorney, Agent, or Firm—William R. Sharp

[57] ABSTRACT

A 3-D seismic prospecting method is provided which employs an areal array of sources and receivers by which seismic traces are generated. The areal array is segregated into a plurality of shells and angularly separated sections from which a preselected number $n_1$ of source-receiver pairs are selected for a particular common midpoint. By means of the shells and sections, the source-receiver pairs so selected have associated therewith a wide range of offsets and azimuth angles for the preselected fold $n_1$. The seismic traces corresponding to the selected source-receiver pairs are summed to give a stacked trace corresponding to the common midpoint.

8 Claims, 8 Drawing Sheets

FIG. 6

```
                    LINE
           1    10   20   30   40
        1 -12344444455677777889ABBA987777776654444443321
          -2456777889ABCDDDEFFHIKKIGFEDDDCCBA9877765532
          -356788899ABCDEEEFGGIJLLIGFEDDDCCBA9877765532
          -3678999AABCDEFFFGHHJKMMJGFEDDDCCBA9877765532
          -3678AAACCDEFGIIIKLLNOOOOMLKIIIGGFEDCAAA87753
          -3678AAACCDEFGIIIKLLNOOOOMLKIIIGGFEDCAAA87753
          -3678AAACCDEFGIIIKLLNOOOOMLKIIIGGFEDCAAA87753
          -3678BBBEEFHIJMMMOOOOOOOOOOOOOOOLLKIHGDDDA9964
          -379ADDDGGHJKLOOOOOOOOOOOOOOOOOOOLLKIHGDDDA9964
       10 -379ADDDGGHJKLOOOOOOOOOOOOOOOOOOOLLKIHGDDDA9964
          -49BCGGGKKLNOOOOOOOOOOOOOOOOOOOOOOMLKGGGCBB75
          -49BCGGGKKLOOOOOOOOOOOOOOOOOOOOOOONMLHHHDCC86
          -49BCGGGKKLOOOOOOOOOOOOOOOOOOOOOOONMLHHHDCC86
          -5BDEJJJOOOOOOOOOOOOOOOOOOOOOOOOOOOOKKKFEE97
          -5BDEJJJOOOOOOOOOOOOOOOOOOOOOOOOOOOOKKKFEE97
          -5BDEJJJOOOOOOOOOOOOOOOOOOOOOOOOOOOOKKKFEE97
          -5BDEJJJOOOOOOOOOOOOOOOOOOOOOOOOOOOOKKKFEE97
          -5BDEJJJOOOOOOOOOOOOOOOOOOOOOOOOOOOOKKKFEE97
          -6CEFKKKOOOOOOOOOOOOOOOOOOOOOOOOOOOOLLLGFFA8
       20 -6CEFKKKOOOOOOOOOOOOOOOOOOOOOOOOOOOOLLLGFFA8
          -7EGHMMMOOOOOOOOOOOOOOOOOOOOOOOOOOOOOIHHB9
          -7EGHNNNOOOOOOOOOOOOOOOOOOOOOOOOOOOOOIHHB9
          -7EGHNNNOOOOOOOOOOOOOOOOOOOOOOOOOOOOOIHHB9
          -7EGHNNNOOOOOOOOOOOOOOOOOOOOOOOOOOOOOIHHB9
          -9HJKOOOOOOOOOOOOOOOOOOOOOOOOOOOOOOOOLKKDB
          -9HJKOOOOOOOOOOOOOOOOOOOOOOOOOOOOOOOOLKKDB
          -AIKLOOOOOOOOOOOOOOOOOOOOOOOOOOOOOOOOMLLEC
          -9GHHOOOOOOOOOOOOOOOOOOOOOOOOOOOOOOOOIIICB
          -8EFFLLLOOOOOOOOOOOOOOOOOOOOOOOOOOOOMMMFGGBA
       30 -7CEEKKKOOOOOOOOOOOOOOOOOOOOOOOOOOOOMMMGGGBA
          -8DEEKKKOOOOOOOOOOOOOOOOOOOOOOOOOOOONNNHHHCB
          -9FGGMMMOOOOOOOOOOOOOOOOOOOOOOOOOOOONNNGHHBB
          -9FGGMMMOOOOOOOOOOOOOOOOOOOOOOOOOOOONNNHHHBB
          -AHIIOOOOOOOOOOOOOOOOOOOOOOOOOOOOOOOOIJJDD
          -BIJJOOOOOOOOOOOOOOOOOOOOOOOOOOOOOOOMMMHHHCC
          -BHHHMMMOOOOOOOOOOOOOOOOOOOOOOOOOOOOMMMHHHCC
          -BHHHMMMOOOOOOOOOOOOOOOOOOOOOOOOOOOOMMMHHHCC
          -BHHHMMMOOOOOOOOOOOOOOOOOOOOOOOOOOOOMMMHHHCC
          -BHHHMMMOOOOOOOOOOOOOOOOOOOOOOOOOOOOLLLGGGBB
       40 -BHHHMMMOOOOOOOOOOOOOOOOOOOOOOOOOOOOLLLGGGBB
          -AFFFJJJLMMOOOOOOOOOOOOOOOOOOOOOOOOLLLIIIEEEAA
          -AFFFJJJLLMOOOOOOOOOOOOOOOOOOOOOOOOLLLIIIEEEAA
          -AFFFJJJNMMOOOOOOOOOOOOOOOOOOOOOOOOLLMIIIEEEAA
          -AFFFJJJNMMOOOOOOOOOOOOOOOOOOOOOOOOMMMIIIEEEAA
          -CIIIMMNOOOOOOOOOOOOOOOOOOOOOOOOOOOMMMHHHCC
          -BHHHMMMOOOOOOOOOOOOOOOOOOOOOOOOOOOOLLLGGGBB
          -BHHHMMMOOOOOOOOOOOOOOOOOOOOOOOOOOOOLLLGGGBB
          -AFFFKKKNNOOOOOOOOOOOOOOOOOOOOOOOOOMMMIIIEEEAA
          -BHHHMMMOOOOOOOOOOOOOOOOOOOOOOOOOOOOLLLGGGBB
       50 -BHHHMMMOOOOOOOOOOOOOOOOOOOOOOOOOOOOMMMHHHCC
          -CIIINNNOOOOOOOOOOOOOOOOOOOOOOOOOOOOLLLGGGBB
          -BHHHMMMOOOOOOOOOOOOOOOOOOOOOOOOOOOOLLLGGGBB
          -BHHHMMMOOOOOOOOOOOOOOOOOOOOOOOOOOOOLLLGGGBB
          -AGGGLLLOOOOOOOOOOOOOOOOOOOOOOOOOOOOKKKFFFAA
          -AHHHNNNOOOOOOOOOOOOOOOOOOOOOOOOOOOONNNHHHBB
          -AHHHNNNOOOOOOOOOOOOOOOOOOOOOOOOOOOONNNHHHBB
          -BIIIOOOOOOOOOOOOOOOOOOOOOOOOOOOOOOOONNNHHHBB
          -BJJJOOOOOOOOOOOOOOOOOOOOOOOOOOOOOOOOOIIIBB
          -AHIIOOOOOOOOOOOOOOOOOOOOOOOOOOOOOOOOMMMGGGAA
       60 -BJKLOOOOOOOOOOOOOOOOOOOOOOOOOOOOOOOOOJIICB
          -BJLMOOOOOOOOOOOOOOOOOOOOOOOOOOOOOOOOKJJCA
          -AIKLOOOOOOOOOOOOOOOOOOOOOOOOOOOOOOOOKJJCA
          -AIKLOOOOOOOOOOOOOOOOOOOOOOOOOOOOOOOOKJJCA
          -AIKLOOOOOOOOOOOOOOOOOOOOOOOOOOOOOOOOKJJCA
          -9GIJOOOOOOOOOOOOOOOOOOOOOOOOOOOOOOOOIHHB9
          -9GIJOOOOOOOOOOOOOOOOOOOOOOOOOOOOOOOOIHHB9
          -9GIJOOOOOOOOOOOOOOOOOOOOOOOOOOOOOOOOIHHB9
          -9GIJOOOOOOOOOOOOOOOOOOOOOOOOOOOOOOOOIHHB9
          -9GIJOOOOOOOOOOOOOOOOOOOOOOOOOOOOOOOOIHHB9
       70 -9GIJOOOOOOOOOOOOOOOOOOOOOOOOOOOOOOOOIHHB9
          -9GIJOOOOOOOOOOOOOOOOOOOOOOOOOOOOOOOOIHHB9
          -7DFGLLMOOOOOOOOOOOOOOOOOOOOOOOOOOOOKKKFEE97
          -7DFGLLMOOOOOOOOOOOOOOOOOOOOOOOOOOOOKKKFEE97
          -7DFGLLMOOOOOOOOOOOOOOOOOOOOOOOOOOOOKKKFEE97
          -7DFGLLMOOOOOOOOOOOOOOOOOOOOOOOOOOOOKKKFEE97
          -6BDEIIJNNOOOOOOOOOOOOOOOOOOOOOOOONMKHHHDCC86
          -6BDEIIJNNOOOOOOOOOOOOOOOOOOOOOOOONMKHHHDCC86
          -5ACDHHIMMNOOOOOOOOOOOOOOOOOOOOOOOMLJGGGCBB75
          -48ABEEFIIJMNOOOOOOOOOOOOOOOOOOOOMMLIHFDDDA9964
       80 -48ABEEFIIJMNOOOOOOOOOOOOOOOOOOOOMMLIHFDDDA9964
          -48ABEEFIIJMNOOOOOOOOOOOOOOOOOOOOMMLIHFDDDA9964
          -479ACCDFFGIJLMMMOOOOOOOOOOONMKKJHHGEDBAAA87753
          -479ACCDFFGIJLMMMOOOOOOOOOOONMKKJHHGEDBAAA87753
          -3689BBCEEFHIKLLLNOOOOOOOONMKKJHHGEDBAAA87753
          -2467889AABCDEFFFGHHIKMMKIGFEEDCCBA9877765542
          -245677899ABCDEEEFGGHJLLJHGFEEDCCBA9877765542
          -12334445556667778889ABBA98877766655544433321
```

STATION

FIG. 7

THREE DIMENSIONAL SEISMIC PROSPECTING METHOD

BACKGROUND OF THE INVENTION

This invention relates to a three dimensional (3-D) seismic prospecting method wherein data is collected for a 3-D seismic areal array of sources and receivers and wherein such data is processed in a manner which optimizes certain seismic parameters which are discussed further below.

In 3-D seismic prospecting, an areal array of seismic sources and receivers are positioned over an area of the earth's surface and seismic data is collected in the form of seismic traces which are generated by the receivers in response to reflected acoustic waves. This is in contrast to two dimensional seismic prospecting wherein a line rather than an areal array of sources and receivers is utilized. In 3-D as well as in two dimensional seismic prospecting it is desirable to "stack" a number of traces (commonly called a common midpoint bin or gather) which correspond to a number of source-receiver pairs which share a common midpoint. As used herein, the term "source-receiver pair" refers to a source position and receiver position located on opposite sides of a common midpoint and spaced substantially equidistantly from the common midpoint. Stacking of seismic traces corresponding to such source-receiver pairs involves summing of the traces so as to enhance important reflection events in the traces and remove spurious noise which can obscure the reflection events. In other words, stacking enhances the signal to noise ratio.

Certain parameters which characterize a group of 3-D source-receiver pairs corresponding to a particular common midpoint include fold, offset and azimuth. Fold refers to the number of source-receiver pairs sharing a common midpoint for which traces are stacked. For example, if there are 16 source-receiver pairs for a particular stack, there are 16 folds. Offset is simply the distance between the source and receiver of a particular source-receiver pair. Azimuth is the angular orientation of the source-receiver pair. More precisely, the azimuth angle for a particular source-receiver pair is the angle defined between the line along which the source-receiver pair lies and a preselected direction such as true east or north.

In planning a 3-D seismic areal array according to conventional techniques, it is desirable to position the sources and receivers to optimize certain conditions with respect to fold, offset and azimuth.

With respect to fold, it is desirable to have an adequate number of folds for each common midpoint in order to give an acceptable signal to noise ratio in the resulting stacked trace. It is also desirable to have uniformity of fold among a maximum number of common midpoints for a particular areal array. This results in a uniform signal to noise ratio for the various stacked traces. With such a uniform signal to noise ratio among stacked traces, any variation of amplitude from trace to trace will be related to the strength of reflection events and not the difference in the number of traces being summed. This makes seismic interpretation easier and more accurate.

With respect to offset, it is desirable to have a maximum variation of offsets for the source-receiver pairs corresponding to a particular common midpoint. The different offset values are utilized to derive an average stacking velocity for the traces being stacked. Such a stacking velocity is used to correct for normal moveout among the traces. Maximizing the distribution of offset values serves to enhance the accuracy of the derived stacking velocity and thus also the accuracy of the resulting normal movement correction.

With respect to azimuth, it desirable to have a maximum variation in azimuth angles among the source-receiver pairs corresponding to a particular common midpoint. By having many different azimuth angles, the accuracy of 3-D statics solutions is enhanced. Statics are corrections applied to seismic data to correct for low velocities (weathering velocities) of seismic waves encountered in unconsolidated sediments near the earth's surface.

Planning the positioning of sources and receivers in a 3-D seismic areal array to optimize the various parameter conditions discussed above is typically done by trial and error placement of sources and receivers until the desired optimization of conditions is obtained. Such a procedure is extremely time consuming. Depending on the size of the areal array, such a procedure can take from about a week to several weeks to carry out. This translates to a high expense and an adverse effect on the efficiency of a particular seismic prospecting project.

SUMMARY OF THE INVENTION

It is, therefore, an object of the invention to provide a 3-D seismic prospecting method which yields seismic data optimized with respect to fold, offset and azimuth parameters.

It is a further object of the invention to provide such a seismic prospecting method which is less time consuming and thus more efficient then prior methods.

The above objects are realized by a 3-D seismic prospecting method which comprises the steps of: (a) producing a plurality of seismic traces respectively corresponding to a plurality of seismic source-receiver pairs which define an areal array of source positions and receiver positions, wherein each source-receiver pair includes a source position and a receiver position and wherein any one seismic trace is produced by a seismic receiver located at the receiver position of the corresponding source-receiver pair in response to the reflection of at least one seismic wave transmitted into the subsurface of the earth by a seismic source located at the source position of the corresponding source-receiver pair; (b) selecting a fold number $n_1$, where $n_1$ is an integer of at least 2; (c) selecting a common midpoint (CMP) of a set of source-receiver pairs which define at least a portion of the areal array, wherein the source position and receiver position of each source-receiver pair of the set has said CMP as the midpoint therebetween and wherein the number of source-receiver pairs in the set is greater than $n_1$; (d) segregating the areal array into $n_2$ angularly separated sections defined by at least one imaginary boundary passing through the CMP, where $n_2$ is an integer and $2 \leq n_2 \leq n_1$; (e) segregating at least a portion of the areal array into $n_3$ shells defined by $n$, imaginary closed and nonintersecting boundaries which surround the CMP, such that the innermost shell is defined by the boundary closest to the CMP and such that each other shell is defined between adjacent shell boundaries, where $n_3$ is an integer and $2 \leq n_3 \leq n_1$; (f) selecting $n_1$ source positions or $n_1$ receiver positions in the areal array which correspond to $n_1$ source-receiver pairs of the set of source-receiver pairs having the CMP as their midpoint, such selecting of source positions or receiver positions being performed such that each shell and each section includes at least one selected source position or receiver position therein to the extent that each section or shell has at least one source position or receiver position which corresponds to a source-receiver pair of the set of source-receiver pairs having the CMP as their midpoint; (g) summing the seismic traces which correspond to the $n_1$ source-receiver pairs of step (f) so as to yield a stacked trace.

The method can be applied to a plurality of common midpoints corresponding to the areal array. Since a constant number of source-receiver pairs are selected for the various common midpoints, uniform fold is achieved. By segregating the areal array into shells and angularly separated sections, and then selecting source positions or receiver positions such that each shell and section has a selected source position or receiver position therein, this ensures that the source-receiver pairs for a particular common midpoint have associated therewith a plurality of different offsets and azimuth angles. The shells force the selection of a range of offsets whereas the sections force the selection of a range of azimuth angles. As discussed previously, uniform fold, and a good offset and azimuthal distribution are particularly advantageous in processing of the seismic traces.

In accordance with a preferred embodiment of the invention, an areal array pattern can be selected arbitrarily before step (a) of the invention as described above, most typically in the form of a symmetrical arrangement of source positions and receiver positions. The resulting data as collected by means of step (a) is then processed or "decimated" to achieve the desired conditions with respect to fold, offset and azimuth. In effect, then, only part of the seismic data actually obtained is selected for a particular common midpoint, and the remainder of the data is not used. It is desirable, therefore, in accordance with the invention to "overshoot" the areal array, or employ a sufficient number of source-receiver pairs so as to have sufficient data from which to select. That means, of course, that more source-receiver pairs are typically utilized for a particular common midpoint in accordance with the invention than in the conventional trial and error procedure described previously. However, planning of the areal array and processing of the data in accordance with the invention takes only, for example, a matter of hours as compared to the considerable amount of time (i.e. weeks) required using the conventional procedure. The savings in time utilizing the invention has been found to contribute to the overall efficiency of a 3-D seismic prospecting project and also lower expenses, despite the use of a larger number of source-receiver pairs.

BRIEF DESCRIPTION OF THE DRAWINGS

FIG. 6 is a common midpoint fold map which illustrates the number of folds for each common midpoint of the FIG. 4 areal array before processing of data in accordance with the invention.

FIG. 7 is a common midpoint fold map which illustrates the number of folds for each common midpoint of the areal array after data processing in accordance with the invention.

DETAILED DESCRIPTION OF THE INVENTION

A preferred embodiment of the invention will now be described with reference to FIG. 1. The following description will be broken down into the various steps of the preferred embodiment. Some of the steps can be performed in a different order if desired. The steps of this preferred embodiment are set forth in the flow chart of FIG. 2.

With respect to terminology used herein and in the appended claims, the term "areal array" as applied to source positions and receiver positions means that such source positions and receiver positions do not lie along a single line but instead generally define a plane. As used in the following discussion, the term "array" will be understood to denote an areal array.

1. Select Array of Source Positions and Receiver Positions

Figure 1:
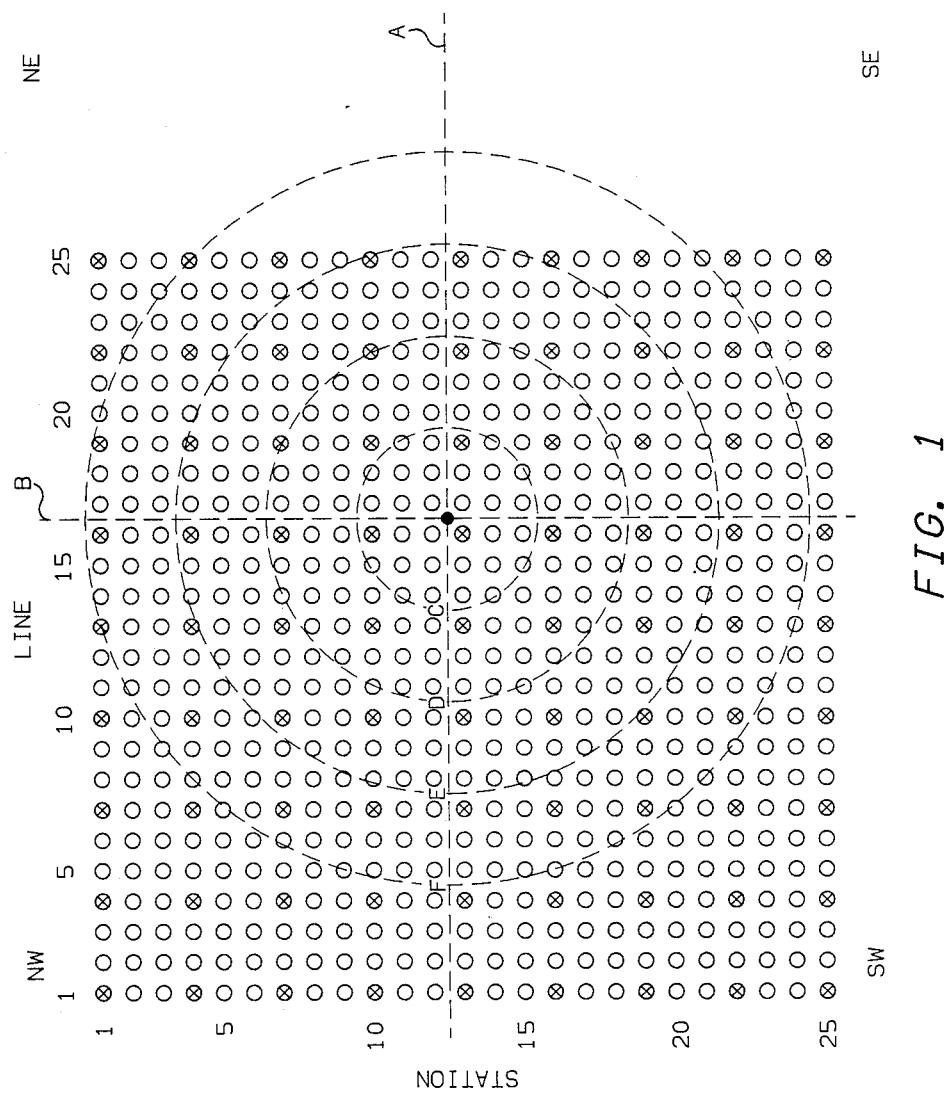
FIG. 1 shows a source-receiver areal array and the boundaries of shells and sections in accordance with a preferred embodiment of the invention.
Figure 2:
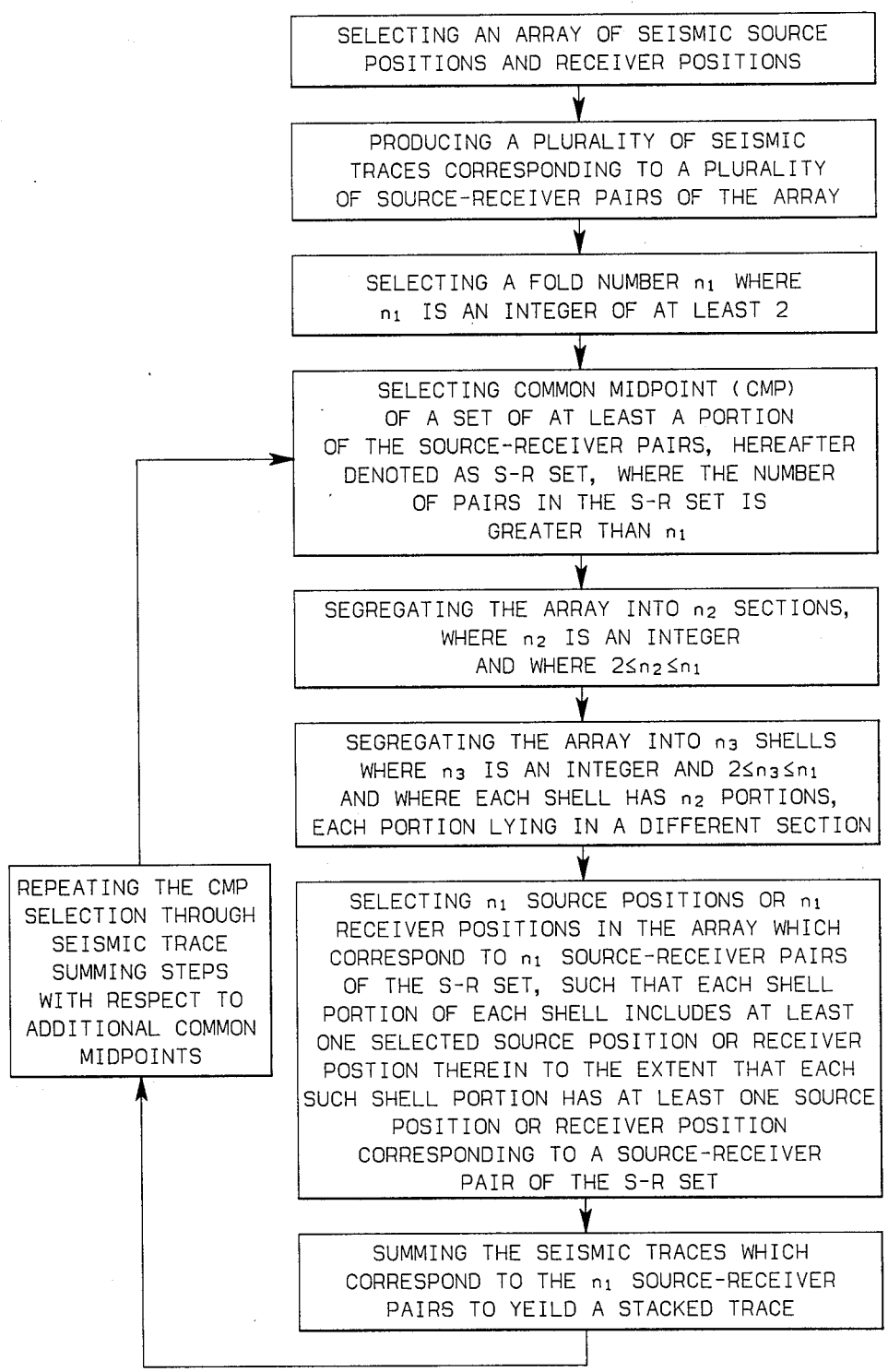
FIG. 2 is a flow chart which sets forth the steps of a preferred embodiment of the invention.

An arrangement of source positions and receiver positions is selected, such as, for example, the array shown in FIG. 1. Receiver positions are indicated by circles and source positions are indicated by X's. A circle with an X therein indicates a source position and receiver position being at the same location. The particular array shown has 25 lines (columns) and 25 stations (rows). Source or receiver positions can be easily denoted using such a line, station coordinate system. For example, the receiver position at line number 1 and station number 5 can be denoted as being at coordinates (1,5). The particular arrangement of source positions and receiver positions selected for this array can be expressed as a 3×3 array. That is, every third line and every third station has an associated source position, whereas each line and station of the array has an associated receiver position.

Of coures, other arrays are within the scope of the invention, such as 2×3, 3×4, 4×4, etc. Modifications of such column×row arrays are also within the scope of the invention. For example, the outer edges can be "padded" with extra source positions to maximize fold for common midpoints near outer edges of the array. Or, an array could be selected which has no particular pattern (i.e. orderly distribution) whatsoever. However, a predetermined pattern of source and receiver positions is generally preferred.

It is further preferable that the "shot density", or number of source positions per unit area, is sufficient to give the maximum number of folds which might be desired in subsequent data processing of traces associated with common midpoints of the array. Such an acceptable shot density can be easily checked by a cursory check of a few randomly selected midpoints. One can determine by a visual examination of an array illustration, such as FIG. 1, whether or not a sufficient number of source-receiver pairs share a particular common midpoint. Alternatively, a portion of a computer program like that set forth later in this application can be employed to derive a common midpoint fold map before any seismic shooting is actually carried out. Such a map is discussed in a subsequent example, and indicates the number of folds for each of the common midpoints associated with the array. If it appears from such a map, or from a cursory visual examination, that the fold numbers are not high enough, the shot density for the array can simply be increased to accordingly increase fold.

With regard to shape of the selected array, it is preferable that the outer perimeter of the array be in the shape of a parallelogram. The array perimeter in FIG. 1 is in the shape of a particular parallelogram, a square.

2. Collect Seismic Data

In this embodiment, it will be assumed that receivers are positioned at each of the receiver positions of FIG. 1, and that each receiver detects reflected seismic waves resulting from a single shot. However, it is within the scope of the invention to shoot the array in multiple layouts, where each layout includes receivers positioned at only a portion of the receiver positions of the selected array. Such a multiple layout shooting technique will be discussed further in a subsequent example.

Referring to FIG. 1, at least one seismic wave is generated by a source from each source position of the illustrated array in sequence by any suitable technique, such as Vibroseis or detonation of explosive charges. For example, a sequence of shots could be undertaken starting with the source position at (1,1), followed by the source position at (4,1), etc., and ending with the source position at (25,25).

For any particular source which transmits a seismic wave into the subsurface of the earth, such seismic wave is reflected by strata boundaries in the subsurface so as to be received by each of the receivers. Each such receiver generates in response thereto a seismic trace. Accordingly, any one seismic trace corresponds to a particular source-receiver pair. If a computer is being used to implement the method, as is preferred, each resulting trace is stored in the computer along with its associated source-receiver pair. The identity of a source-receiver pair can be stored in computer memory by means of station and line coordinates, for example. This data is therefore stored and ready for access in subsequently described data processing steps.

3. Select Fold Number

The number of folds desired is selected, which will hereinafter be denoted by $n_1$. The number $n_1$ corresponds to the number of source-receiver pairs to be selected in accordance with subsequent step 7 which share a common midpoint. The number of folds selected depends on such factors as the number of available source and receiver equipment, the desired signal to noise ratio, and the size of the area over which uniform fold is desired. Such factors will become more apparent in the description of a subsequent example. The number $n_1$ is an integer, and is at least 2 since a minimum of two traces can be stacked for a particular common midpoint. For the illustrated embodiment, $n_1$ has been selected to be 16.

4. Select a Common Midpoint (CMP)

A common midpoint is selected with respect to a set of source-receiver pairs which have corresponding seismic traces. Each source-receiver pair of the set has a source position and a receiver position having the selected common midpoint as the midpoint therebetween. The selected common midpoint, which will hereinafter be referred to as the CMP, will be assumed to be the CMP indicated in FIG. 1 for the sake of illustration. It can be seen from an examination of FIG. 1 that the set of source-receiver pairs having the CMP as their midpoint includes a number of pairs greater than $n_1$, which in this particular embodiment is 16. Therefore, as will become apparent later, not all of such pairs will be selected in subsequent step 7.

5. Segregate Array into Sections

The array of FIG. 1 is now segregated into a selected number $n_2$ of angularly separated sections. There are four such sections in the embodiment of FIG. 1 which are defined by imaginary boundary lines A and B. Boundary lines A and B are generally perpendicular and intersect at the CMP so as to divide the array into 90° quadrants. The quadrants are labeled directionally as NW, NE, SE and SW.

Although four sections are preferred, any other number of sections, as defined by at least one boundary passing through the CMP, is within the scope of the invention as long as $2 \leq n_2 \leq n_1$ where $n_2$ is an integer. Clearly, providing only two sections gives the minimum degree of azimuthal distribution as will be apparent from step 7. There cannot be more than $n_1$ sections since there would be more sections than the $n_1$ array positions to be selected in step 7.

In the implementation of the method by a computer, the various source and receiver positions are assigned to a particular section in the computer memory and are then accessed accordingly in the subsequent selection step 7.

6. Segregate Array into Shells

At least a portion of the array is segregated into $n_3$ shells. It can be seen from FIG. 1 that a portion of the array of the illustrated embodiment is divided into four shells as defined by four imaginary closed and nonintersecting boundaries C, D, E and F which surround the CMP. The shell boundaries are preferably circular and concentric with respect to the CMP. As shown, the innermost shell is defined by boundary C, whereas the other shells are defined by adjacent shell boundaries. For the purpose of the following discussion, the innermost shell defined by boundary C will be denoted as the first shell; the shell defined between boundaries C and D will be denoted as the second shell; the shell defined between boundaries D and E will be denoted as the third shell; and the shell defined between boundaries E and F will be denoted as the fourth shell.

It can further be seen from FIG. 1 that the sectional boundary lines A and B divide each shell into $n_2$, in this case four, portions. Thus, each shell can be considered to have four portions where each such portion lies in a different section.

The diameter of the outermost boundary F in the illustrated embodiment is approximately equivalent to the length of each side of the array. Such a sizing of the shell boundaries is typically preferable for a square array as in FIG. 1. Generally speaking, the diameter of the outermost shell boundary is preferably set to be the maximum desired offset of source position and receiver position of source-receiver pairs selected in accordance with step 7.

With respect to the number $n_3$ of shells, although four shells are provided in FIG. 1, any number can be provided as long as $2 \leq n_3 \leq n_1$ where $n_3$ is an integer. The lower and upper limits of this range are set for similar reasons cited with respect to the sections.

7. Select Source-Receiver Pairs

The selected number $n_1$ of source-receiver pairs are now selected by selecting either $n_1$ source positions or $n_1$ receiver positions from the array. For the purpose of this discussion $n_1$ source positions will be selected.

Assuming that this selection step starts with the SE section, one source position is selected from each shell in this section. Beginning with the first, innermost shell, the source position at (19,13) is selected for this shell since it is the only source position available for selection. In the second shell, two source positions are available for selection. One of these source positions, say the source position at (19,16), is randomly selected. Source positions at (22,19) and (25,19) can be similarly selected from the third and fourth shells respectively. The selected source positions at (19,13), (19,16), (22,19) and (25,19) have corresponding receiver positions at (14,12), (14,9), (11,6) and (8,6) respectively so as to comprise four respective source-receiver pairs which have the CMP as their midpoint.

Similarly with respect to the SW section, source positions at (16,13), (13,16) and (10,16) can be selected from the first, second and third shells respectively. For the fourth shell, assume for the sake of illustration that the source position at (7,13) is randomly selected. However, this source position has no corresponding receiver position having the CMP as the midpoint therebetween. Therefore, this source position cannot be selected for the purpose of the method. The source positions at (7,16) and (7,19) also cannot be selected for the same reason. The source position at (10,22) can be selected, however, and will be selected for the purpose of this description. The selected source positions at (16,13), (13,16), (10,16) and (10,22) have corresponding receiver positions at (17,12), (20,9), (23,9) and (23,3) respectively so as to comprise four respective source-receiver pairs having the CMP as their midpoint.

Source positions at (16,10), (13,10), (10,7) and (10,4) can be selected from each of the shells of the NW section in a similar manner. These sources have corresponding receiver positions at (17,15), (20,15), (23,18) and (23,21).

Finally with respect to the NE section, it can be seen that no source positions are within the first shell. Therefore, no source position can be selected within this shell. This will be handled in a manner described further below. Source positions at (19,10), (22,7) and (19,1), having corresponding receiver positions at (14,15), (11,18) and (14,24), can be selected from the second, third and fourth shells respectively. Since only three source positions have been selected from the NE section so far, another source position is to be selected in order for the total number selected to come to $n_1$, which as noted above is 16 in this particular embodiment. Therefore, a final source position can be selected from any shell, other than of course the first shell, in the NE section. For the sake of illustration, it can be assumed that the source position at (22,4) from the fourth shell is selected. This source position has a corresponding receiver position at (11,21).

Thus, a total of sixteen source-receiver pairs have been selected in accordance with the invention. The source positions to which these source-receiver pairs correspond have been selected from all four sections and all four shells so that each of the four portions of each shell includes a selected source position, except of course for the portion of the first shell in the NE section which includes no source position therein. Having $n_2$ sections where $n_2=4$ and $n_3$ shells where $n_3=4$ serves to optimize the offset and azimuthal distribution of the $n_1$ corresponding source-receiver pairs where $n_1=16$. It can generally be stated in this regard that is preferable that $n_2$ and $n_3$ be selected such that $n_2 \times n_3 = n_1$.

Although not discussed above, boundaries can be assumed to belong to certain shells or sections in order to accommodate any source positions lying directly on such a boundary. For example, the outer shell boundary defining any particular shell could be assumed to be included in the shell which it defines. According to such a convention and by way of example, the source position at (22,10) lying on boundary D in FIG. 1 would be considered to lie in the second shell. Another condition not discussed above is one in which the desired number $n_1$ source-receiver pairs have not been selected after carrying out the above described procedure. For example, assume for the sake of illustration that the NE section in FIG. 1 has only three source positions available for selection such that the total number of selections comes to only fifteen. One can then go to any one of the other three sections and randomly select a last source position to give the desired number of $n_1$ source positions and $n_1$ corresponding source-receiver pairs.

It should be understood that the above described selection procedure could be applied to receiver positions rather than source positions. Also, the selections could be made in a different sequence if desired. For example, one could start with the first shell and select one source position in that shell from each section. Selections would then be made from the second, third and fourth shells similarly.

It should be apparent from the above description that the predetermined number $n_1$ of source-receiver pairs to be selected determines the number of folds for the CMP, and the shells and sections force the selection of source-receiver pairs having associated therewith a range of offsets and azimuth angles respectively. As has been discussed previously, having such a distribution of offsets and azimuth angles for a certain fold number enhance the accuracy of stacking velocity determinations and statics solutions. It should also be apparent that by use of the above described selection procedure, certain source-receiver pairs for which seismic traces were previously collected with respect to the CMP are not selected since only $n_1$ source-receiver pairs and thus only $n_1$ folds are desired. It is in this manner that certain data actually collected is not used.

8. Sum Traces Corresponding to Selected Source-Receiver Position Pairs

With respect to the CMP shown in FIG. 1, each of the seismic traces corresponding to the $n_1$ source-receiver pairs selected in step 7 are summed, preferably after having been corrected for normal moveout, to result in a stacked trace with an enhanced signal to noise ratio.

9. Repeat Steps 4-8 For Additional Common Midpoints

Additional common midpoints of the FIG. 1 array can be selected in accordance with step 4. Typically, for a row x column type array having stations and lines as in FIG. 1, the total number of common midpoints selected (including the CMP shown in FIG. 1) will be equal to [(number of stations $\times 2$)−1]×[(number of lines $\times 2$)−1]. So for the FIG. 1 array having 25 stations and 25 lines, there will typically be 49×49 or 2401 common midpoints.

Steps 5-7 are performed for each additional selected common midpoint so as to result in selected source-receiver pairs corresponding to each midpoint. Of course, the desired number, 16 for the FIG. 1 embodiment, of source-receiver pairs may not be available for selection with respect to midpoints near the outer perimeter of the array, in which case the total number of source-receiver pairs available for selection (those having the selected common midpoint as their midpoint) are selected. However, in accordance with the invention, uniform fold is achieved over a maximum area of the array by limiting the number of source-receiver pairs selected for each common midpoint to $n_1$.

Step 8 is performed with respect to each additional common midpoint to result in a stacked trace for each common midpoint. For all those stacked traces obtained by summing $n_1$ traces, there is uniform fold among the stacked traces so as to provide a uniform signal to noise ratio. As discussed previously, such a uniform signal to noise ratio makes seismic interpretation of the stacked traces easier and more accurate.

EXAMPLE

An example will now be described in which actual field data is collected and processed in accordance with the invention. Steps as set forth in the preceding discussion will be referred to in the following description. This example is provided to further illustrate the invention and should not be construed to limit the invention in any manner.

Figure 3:
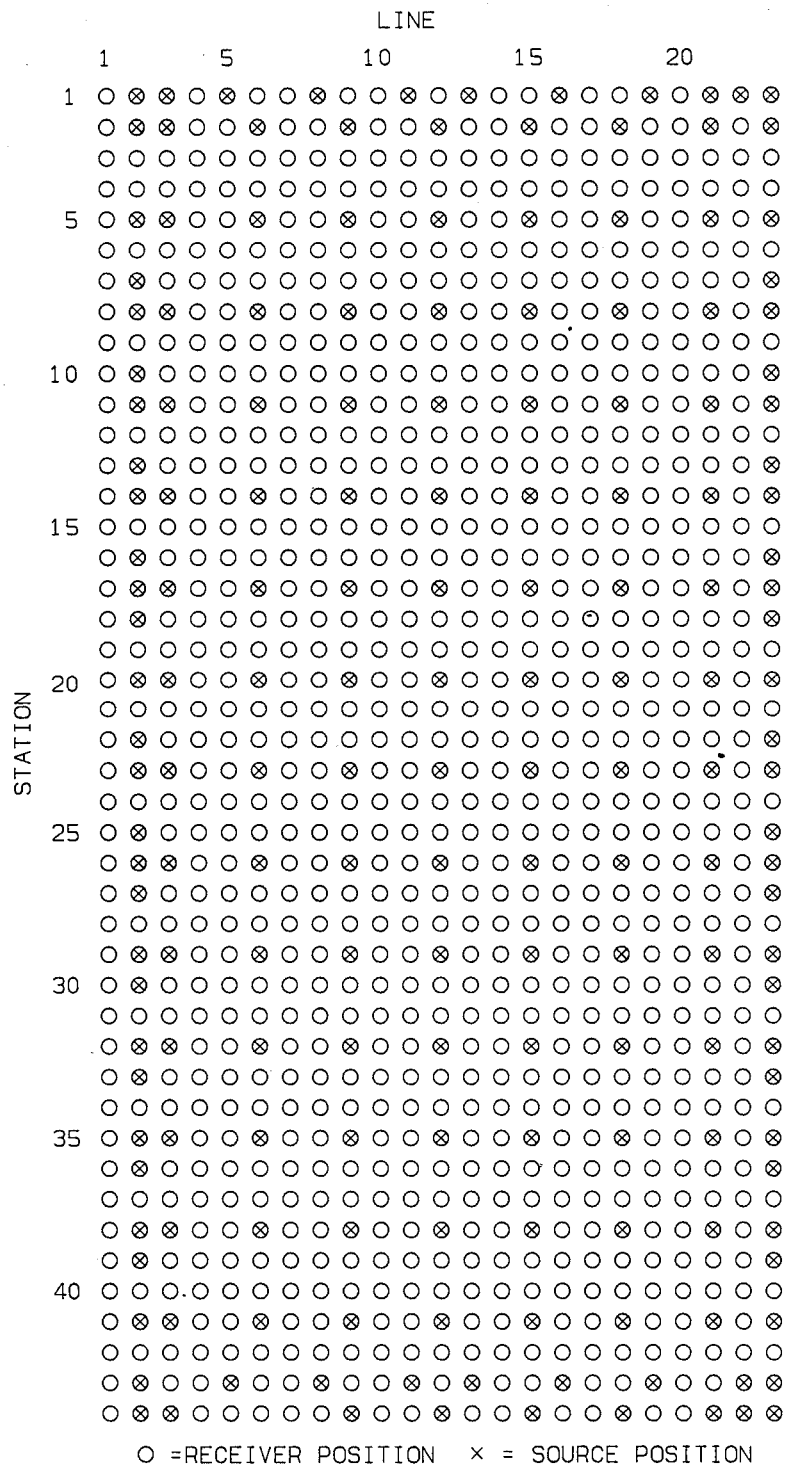
FIG. 3 shows a planned source-receiver areal array for an example described herein in which the invention was applied in the field.

A rectangular 9,460 ft.×4,840 ft. piece of land was chosen to be seismically prospected in accordance with the invention. An array of source positions and receiver positions was selected according to step 1 and is depicted in FIG. 3. For such a planned array, the spacing between each line is 220 ft and the spacing between each station is also 220 ft. It can be seen that the array of FIG. 3 generally follows a 3×3 pattern, with every third line and every third station having a source position associated therewith. However, this general pattern has been modified somewhat by providing additional source positions around the outer edges of the array. The purpose of such additional source positions is, as has been previously explained, to maximize fold for common midpoints near the outer edges of the array. For example, note the sources (2,7), (2,10), etc.

Figure 4:
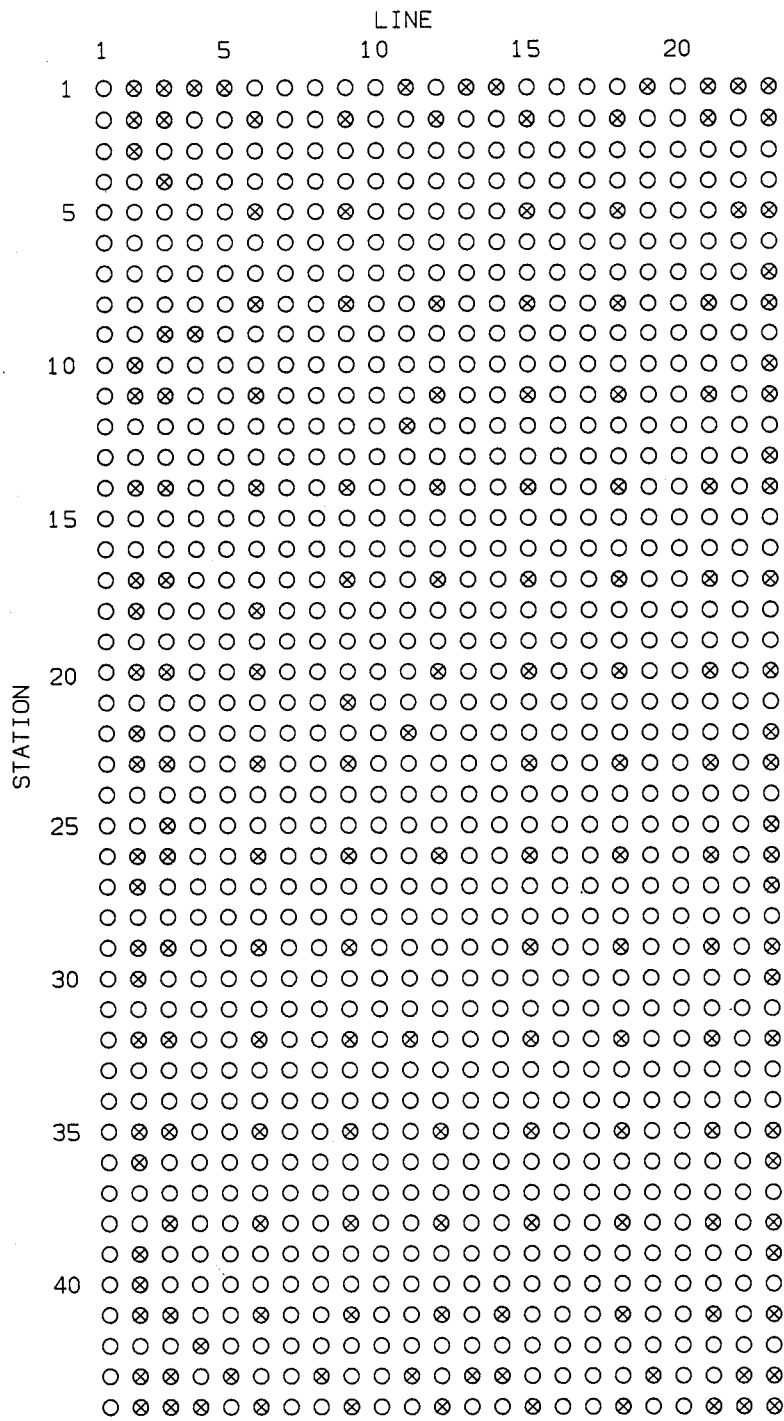
FIG. 4 shows the areal array which was actually employed in the above-mentioned example.

The next step was to actually position receivers in the field in accordance with the array selected. See step 2. However, an insufficient number of receivers were available to lay out the entire array as shown in FIG. 3. Therefore, it was necessary to use multiple layouts, as will be further explained below. In addition, not all of the shots could be generated from the planned source positions because of practical difficulties (i.e. objections of private landowners, surrounding structures, etc.) which would not permit shooting at such positions. The actual positioning of receivers and sources is shown in FIG. 4. Note, for example, that shots could not be generated at planned source positions (2,8) and (3,8) (see FIG. 3). Shots were therefore generated from source positions one station down and one line over at (3,9) and (4,9). Generally, however, the planned array was essentially followed.

In accordance with step 2 and as noted above, seismic data was collected for the entire array by means of multiple layouts. Seven layouts were utilized to cover the array. For each layout, a shot was generated by means of an explosive charge at each source position of the layout in sequence. Seismic traces as produced by the receivers of the layout were accordingly recorded and stored in a computer.

Each layout employed sources and receivers positioned at only a portion of the receiver positions and source positions indicated in FIG. 4. In the following description of each layout, sources or receivers are referred to as being at particular stations. For a particular layout, this means that receivers were positioned at all receiver positions of the indicated stations, and that a shot was generated at each of the source positions of the indicated stations (except as noted with respect to station 18). The layouts were as follows: layout 1-receivers at stations 1–27 and sources at stations 1–5, 8, 9, 11, 12, 14 and 27; layout 2-receivers at stations 5–31 and sources at stations 17, 18 (source at (6,18) only) and 30; layout 3-receivers at stations 6–32 and sources at stations 7,20 and 21; layout 4-receivers at stations 10–36 and sources at stations 10, 22, 23, 25 and 36; layout 5-receivers at stations 13–39 and sources at stations 13, 26 and 39; layout 6-receivers at stations 17–43 and sources at station 29; layout 7-receivers at stations 18–44 and sources at 18 (source at (2,18) only), 32, 35, 38 and 40–44.

Seismic data was collected for each layout in sequence. With respect to the total number of shots for each layout, there were 57, 11, 10, 17, 13, 8 and 59 shots for layouts 1, 2, 3, 4, 5, 6 and 7 respectively. In addition, it should be apparent that each source position indicated in FIG. 4 is assigned to only one of the seven layouts. Thus, only one shot was generated from each source position indicated in FIG. 4 after shooting of all seven layouts.

In accordance with step 3, a fold number $n_1$ of 24 was selected.

Figure 5:
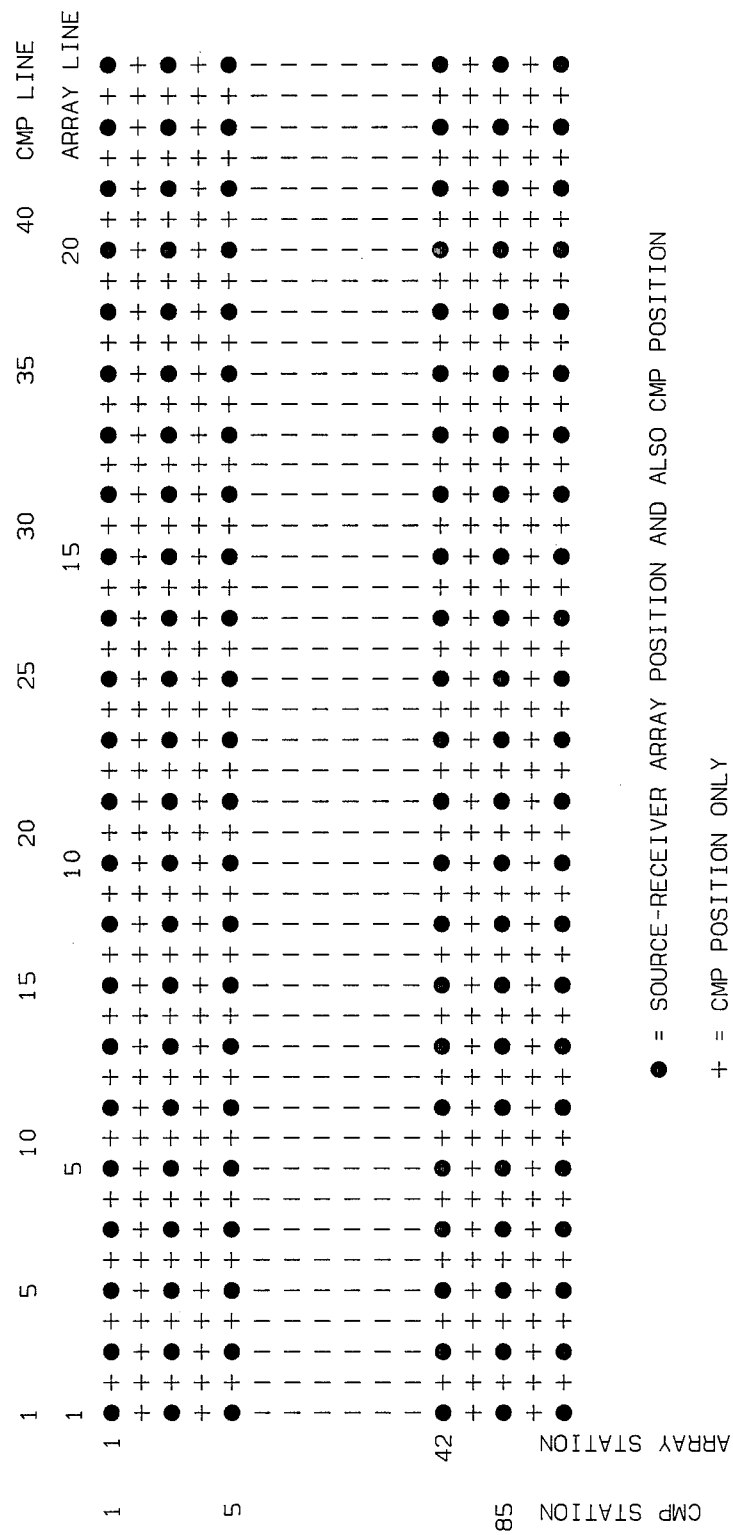
FIG. 5 shows the common midpoints for the FIG. 4 areal array.

With respect to selection of common midpoints according to step 4, reference is made to FIG. 5, which shows the first three stations of array positions and the last three stations of array positions from FIG. 4. Filled in circles represent an array position and also a CMP position and crosses represent CMP positions only. The vertical dashed lines indicate the omission of array positions for stations 4–41. It can be seen from FIG. 5 that a CMP position is selected for each array position, and that each CMP position indicated by a cross corresponds to a midpoint between adjacent array positions. Selecting CMP's in this manner results in a total of 45 lines or columns of CMP positions and 87 stations or rows of CMP positions. The total number of CMP's selected was therefore 45×87 or 3915.

Figure 6:
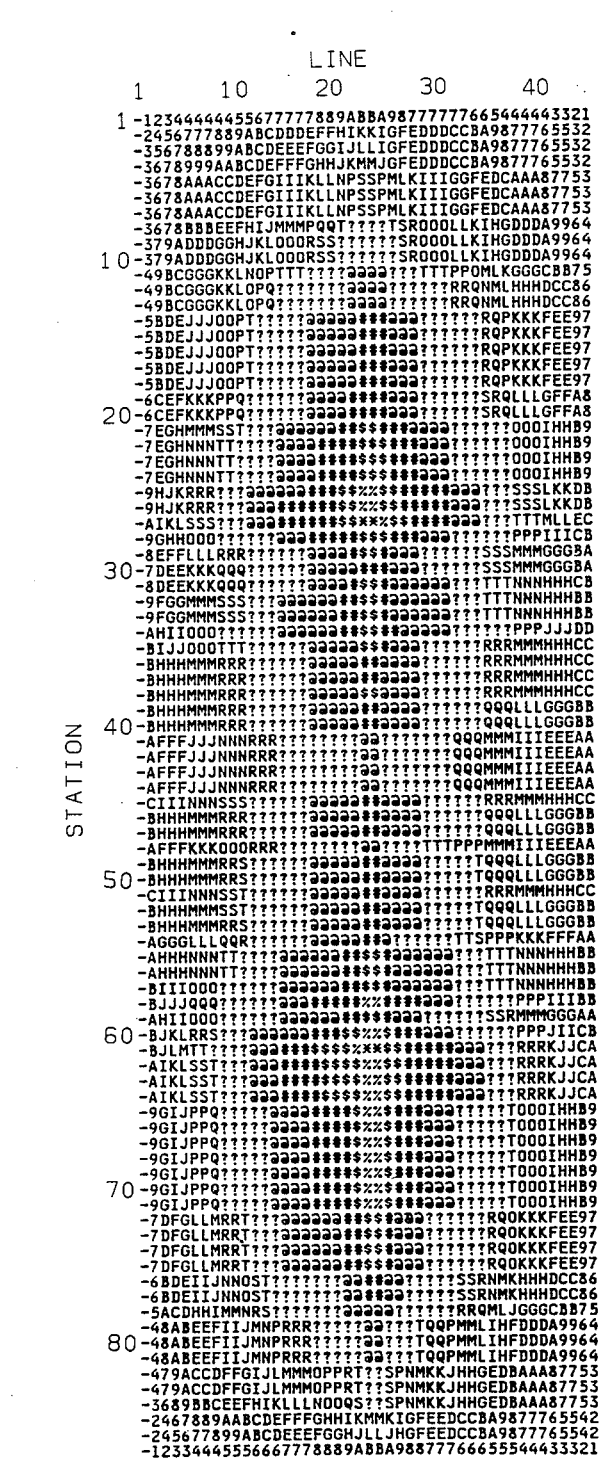

Each CMP has associated therewith a total number, which can be zero, of seismic traces which correspond to a set of source-receiver pairs having the CMP as their midpoint. This total number of traces and corresponding source-reciever pairs for a particular CMP is the number of folds associated with that CMP. A "full fold" CMP map as shown in FIG. 6 indicates the total number of folds for each CMP of the FIG. 4 array before data processing steps of the invention are carried out. This map was generated using a portion of the computer program set forth after this example. Each symbol in FIG. 6 corresponds to a particular CMP and represents the number of folds for that CMP. Table I sets forth the corresponding number of folds for each symbol.

TABLE I

| Symbol | Fold No. | Symbol | Fold No. | Symbol | Fold No. |
|---|---|---|---|---|---|
| — | 0 | C | 12 | O | 24 |
| 1 | 1 | D | 13 | P | 25 |
| 2 . | 2 | E | 14 | Q | 26 |
| 3 | 3 | F | 15 | R | 27 |
| 4 | 4 | G | 16 | S | 28 |
| 5 | 5 | H | 17 | T | 29 |
| 6 | 6 | I | 18 | ? | 30–39 |
| 7 | 7 | J | 19 | δ | 40–49 |
| 8 | 8 | K | 20 | # | 50–59 |
| 9 | 9 | L | 21 | $ | 60–69 |
| A | 10 | M | 22 | % | 70–79 |
| B | 11 | N | 23 | * | ≧80 |

In the CMP "full fold" configuration of FIG. 6, it can be seen that the fold numbers generally increase from the outer edges of the map to the center of the map. Note for example that the CMP's along station 27 increase in fold number from no folds at (1,27) and 12 folds at (45,27) to more than 80 folds at (23,27) and (24,27).

Steps 5–8 of the method were carried out with respect to each CMP using the above-mentioned computer program.

With respect to steps 5 and 6, four ($n_2$) sections or quadrants and six ($n_3$) shells were employed. The six imaginary boundaries defining the six shells were circular in shape and the outermost circular boundary was sized for each CMP to have a diameter of 6,000 ft. This means for each CMP that the maximum possible offset of a selected source-receiver pair was 6,000 ft. The diameters of the five other shell boundaries had diameters of 5000 ft., 4000 ft., 3000 ft., 2000 ft. and 1000 ft. respectively.

In accordance with step 7, a maximum of 24 source-receiver pairs were selected for each CMP. For those CMP's having less than 24 source-receiver pairs from which to select, all source-receiver pairs for the CMP were selected. A "24 fold" CMP map was generated using the above-mentioned computer program and is depicted in FIG. 7. Symbol notations are the same as in FIG. 6. It can be seen that a uniform fold of 24 (represented by the letter O) extends over a large area of the map. Note, for example, CMP's along station 27 have fold numbers of 24 from (6,27) to (40,27). As has been discussed previously, such a uniform fold characteristic is desirable since it gives a uniform signal to noise ratio among stacked traces corresponding to each CMP.

The selection procedure of step 7 not only resulted in uniform fold, but also gave a wide range of offsets and azimuth angles corresponding to source-receiver pairs selected for each CMP. As previously discussed, a good distribution of offsets enhances the accuracy of stacking velocity determinations and a good distribution of azimuth angles enhances the accuracy of 3-D statics solutions.

Table II illustrates the excellent distributions of offsets and azimuth angles obtained for five particular CMP's. Each CMP is identified by line and station number and can be located by referring to FIG. 7. The offset in feet and azimuth angle in degrees is indicated for each of the 24 selected source-receiver pairs corresponding to a particular CMP. The azimuth angle corresponding to a particular source-receiver pair is defined for the purpose of Table II as the angle defined between: a line passing through the source position and receiver position; and a vector extending from the CMP of the source-receiver pair so as to point in the eastern direction.

TABLE II

| | Offset and Azimuth Angle Distribution | | | | | | | | | |
|---|---|---|---|---|---|---|---|---|---|---|
| Source-Receiver | CMP (12,44) | | CMP (23,27) | | CMP (23,44) | | CMP (23,61) | | CMP (33,44) | |
| Pair | Offset | Azimuth | Offset | Azimuth | Offset | Azimuth | Offset | Azimuth | Offset | Azimuth |
| 1 | 1019 | 191 | 0 | 0 | 1216 | 189 | 1264 | 198 | 447 | 206 |
| 2 | 1720 | 234 | 1697 | 225 | 1843 | 229 | 2433 | 189 | 1612 | 187 |
| 3 | 2607 | 212 | 2400 | 180 | 3605 | 183 | 2884 | 213 | 2600 | 202 |
| 4 | 282 | 315 | 3394 | 225 | 4404 | 182 | 4079 | 258 | 3000 | 216 |
| 5 | 1414 | 278 | 4326 | 213 | 4753 | 202 | 4560 | 217 | 3841 | 231 |
| 6 | 2280 | 307 | 4560 | 195 | 1216 | 279 | 565 | 315 | 1456 | 254 |
| 7 | 3498 | 329 | 1200 | 270 | 2408 | 274 | 1264 | 288 | 824 | 284 |
| 8 | 1811 | 276 | 2400 | 270 | 3605 | 273 | 2433 | 279 | 1612 | 330 |
| 9 | 2545 | 315 | 3046 | 336 | 3736 | 285 | 3046 | 336 | 2441 | 304 |
| 10 | 1720 | 35 | 4176 | 286 | 5000 | 306 | 4308 | 291 | 2340 | 70 |
| 11 | 2607 | 57 | 4664 | 300 | 1341 | 26 | 5381 | 311 | 2973 | 47 |
| 12 | 2842 | 50 | 1200 | 300 | 2600 | 22 | 1442 | 33 | 1280 | 51 |
| 13 | 4204 | 64 | 2683 | 26 | 3000 | 36 | 2332 | 59 | 2236 | 26 |
| 14 | 5314 | 70 | 3600 | 26 | 4386 | 24 | 3124 | 39 | 2009 | 5 |
| 15 | 2416 | 155 | 4118 | 29 | 4565 | 28 | 3687 | 12 | 1077 | 158 |
| 16 | 3111 | 135 | 5215 | 85 | 200 | 90 | 1442 | 123 | 1886 | 122 |
| 17 | 1166 | 120 | 800 | 90 | 1562 | 129 | 2000 | 90 | 3255 | 132 |
| 18 | 2416 | 114 | 1697 | 135 | 2200 | 90 | 3124 | 129 | 4494 | 147 |
| 19 | 2209 | 95 | 2683 | 116 | 3255 | 132 | 3687 | 102 | 2009 | 135 |
| 20 | 1720 | 305 | 3394 | 135 | 4219 | 121 | 4833 | 114 | 2126 | 221 |
| 21 | 1414 | 351 | 4418 | 95 | 4919 | 116 | 4833 | 204 | 2778 | 210 |
| 22 | 1979 | 315 | 4947 | 165 | 5325 | 214 | 5440 | 216 | 2236 | 169 |
| 23 | 1811 | 83 | 1200 | 180 | 2408 | 184 | 4866 | 260 | 2720 | 143 |
| 24 | 2059 | 29 | 3600 | 180 | 4512 | 192 | 6811* | 229 | 2600 | 112 |

*This value exceeds the maximum offset of 6000 ft. This anomaly in the data will only occur when the CMP position is in the center position of the layout and the diagonal distance from the CMP position to any corner of the layout is greater than half the maximum offset distance and when there is a deficiency of source positions in a shell. This anomaly could have been prevented by inserting a conditional command in the program which tests that the distance between a CMP and a source position is less than or equal to half the maximum offset distance.

In accordance with step 8, stacking of the seismic traces corresponding to the selected source-receiver pairs for each CMP was carried out. For any particular CMP, this involved normal movement correction of the corresponding traces and summing of such traces to result in a stacked trace.

Figure 8:
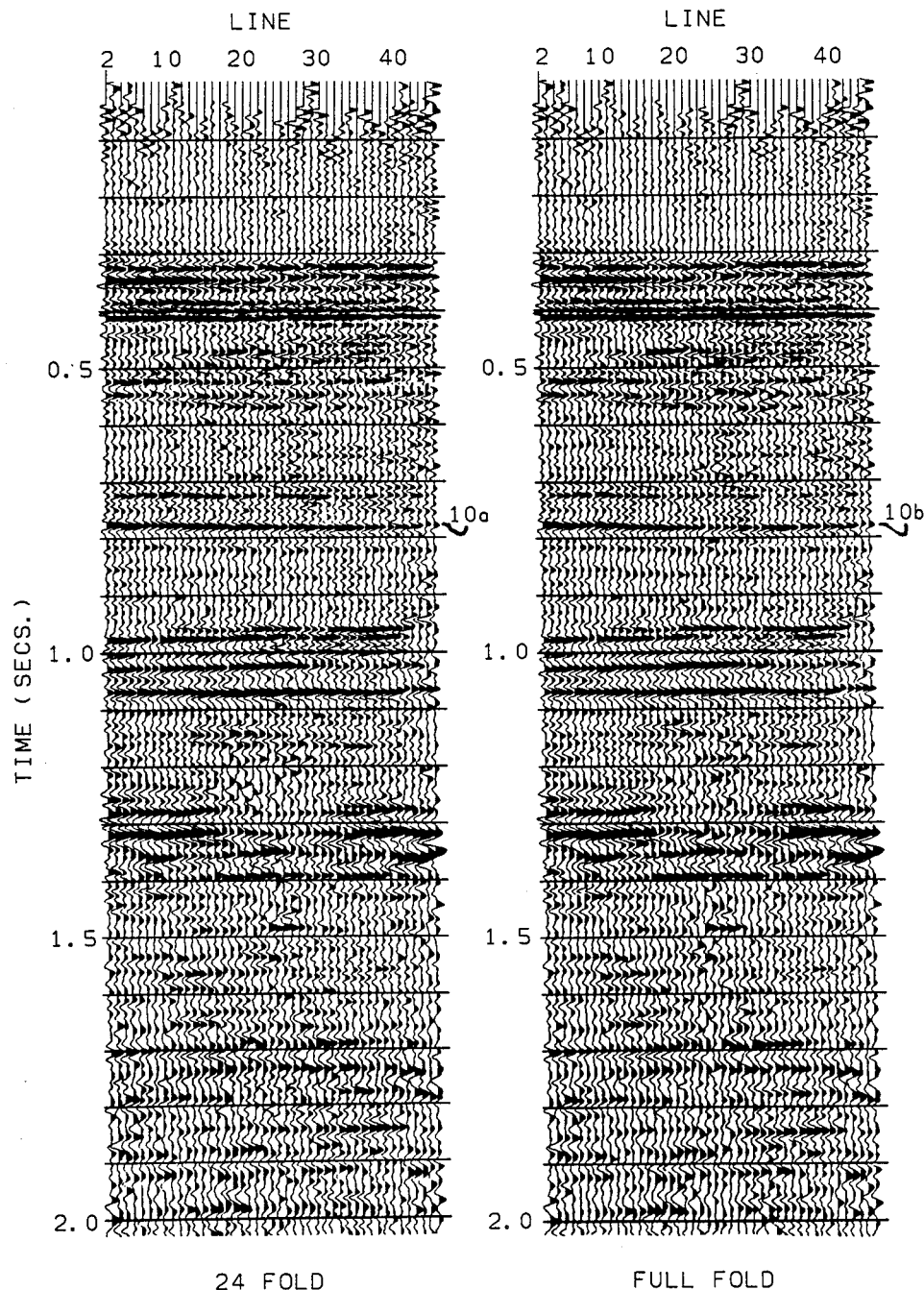
FIG. 8 illustrates a set of stacked traces corresponding to a particular line number for each of the FIG. 6 and FIG. 7 maps.

Referring now to FIG. 8, there is shown a seismic section, labeled "24 FOLD", corresponding to the CMP's for station 27 of the 24 fold CMP map of FIG. 7.

The 24 fold section includes the 44 stacked traces corresponding to 44 CMP's along station 27 from line 2 to 45. Note from FIG. 7 that line 1 has no traces associated therewith. From left to right, the 24 fold section begins with the stacked trace corresponding to the CMP at (2,27) and ends with the stacked trace corresponding to the CMP at (45,27). Also shown in FIG. 8 is a seismic section, labeled "FULL FOLD", which corresponds to the CMP's for station 27 of the full fold CMP map of FIG. 6. This full fold section is illustrated for the purpose of comparison with the 24 fold section obtained after performance of data processing steps of the invention.

The 24 fold section is characterized by highy uniform reflection event amplitudes across the section. This is in contrast to the full fold section which shows variation in amplitude, particularly in the part of the section in the vicinity of lines 20–30 where fold numbers increase to a maximum (see FIG. 6). Note, for example, the reflection interfaces in each section between 0.7 and 0.8 second, between 0.9 and 1.0 second, and between 1.1 and 1.2 seconds. In particular, reference is made to the interface indicated at 10a in the 24 fold section and at 10b in the full fold section. It can be seen that the amplitude remains relatively uniform across interface 10a at lines 20–30, where there is uniform fold (see FIG. 7), but that amplitude changes at lines 20–30 of interface 10b where fold numbers are highest.

COMPUTER PROGRAM

The preferred computer program for accomplishing the data processing steps as described above is set forth in Appendix I. The computer program is written for a 3090 computer manufactured by IBM and is self explanatory to one skilled in the use of the 3090 computer. The input required into the computer program is the seismic data, in digital form, the selected fold number, data relating to shells including maximum source-receiver offset distance, angular data relating to sections, total lines and stations of the array, and source-receiver geometry of each layout of the array.

CONCLUSION

Thus, there is provided by the present invention a method of 3-D seismic prospecting which yields seismic data for an areal array of sources and receivers which is optimized with respect to fold, offset and azimuth. Obviously many modifications and variations of the present invention are possible in light of the above teachings. It is therefore to be understood that within the scope of the appended claims the invention may be practiced otherwise than as specifically described.

APPENDIX I

```
C--- PROGRAM TO GENERATE SOURCE-RECEIVER TABLES FOR DECIMATING
C--- 3-D FULL FOLD COMMON MIDPOINT GATHERS (CMP) OR 3-D SHOT POINT
C--- GATHERS TO A DESIRED MAXIMUM FOLD AND TO DECIMATE CMP TRACE
C--- GATHERS.
C
      PARAMETER(MSL=621, MSS=1012,MCP=3915, IOVER=7  ,IOFD=4800)
      COMMON /WORK/NS(MSL,MSS)
C***************************************************************
C     PARAMETER DEFINITIONS:
C
C        MSL- MAX. STATIONS IN A LAYOUT (MAX. OF IXFP2*IYFP2)
C        MSS- MAX. STATIONS IN SURVEY   (IXFP*IYFP)
C        MCP- MAX. CMP BINS (2*IXFP-1)*(2*IYFP-1)
C      IOVER- MAX. NUMBER OF BIN OVERLAPS (=(ICT) LAYOUTS IN SURVEY)
C       IOFD- OVERLAP FOLD DIMENSION (>IOVER*MSL)
C       IXFP- MAX. NUMBER OF LINES IN SURVEY
C       IYFP- MAX. NUMBER OF STATIONS/LINE IN SURVEY
C        ICT- NUMBER OF LAYOUTS IN SURVEY
C       IDXF- LINE SPACING
C       IDYF- STATION SPACING
C      IXFP1- FIRST LINE NUMBER IN (I) LAYOUT OF SURVEY
C      IXFP2- LAST LINE NUMBER IN (I) LAYOUT OF SURVEY
C      IYFP1- FIRST STATION NUMBER IN (I) LAYOUT OF SURVEY
C      IYFP2- LAST STATION NUMBER IN (I) LAYOUT OF SURVEY
C      MAXNS- NUMBER OF SHOTS IN (I) LAYOUT
C        IC1- LAYOUT COUNT
C        IC2- DEAD STATION FLAG (YES=1; NO=0)
C      MAXDR- NUMBER OF DEAD STATIONS IN THE (I) LAYOUT
C        ISH- X-Y SHOT LOCATIONS IN LAYOUT E.G. (5,10) => 0510
C        IDR- X-Y DEAD STATION LOCATIONS IN THE (I) LAYOUT (SEE
C             EXAMPLE ABOVE FOR STORAGE FORMAT)
C        OFS- MAX. OFFSET DESIRED IN DECIMATED DATA SET
C      IFOLD- MAX. FOLD DESIRED IN DECIMATED DATA SET
C             (I.E A MULTIPLE OF 4 FOR QUADRANTS)
C         SA- STARTING SEARCH AZIMUTH ANGLE IN EACH QUADRANT
C             (E.G. SA = 0, 90, 180, 270 IN 1, 2, 3 AND 4
C             QUADRANTS, RESPECTIVELY)
C        AZW- SEARCH AZIMUTH ANGULAR RANGE FOR EACH QUADRANT
C             (E.G. AZW= 89 DEGREES FOR EACH QUADRANT)
C      ISEED- (INTEGER BETWEEN -1 AND -65536)
C        IQO- 4 FOR QUADRANTS
C        IWR- VECTOR FOR STORING SHOT AND STATION LOCATIONS
C      XORIG- X AXIS ORIGIN IN USGS STATE PLANE COORDINATES
```

```
C      YORIG- Y AXIS ORIGIN IN USGS STATE PLANE COORDINATES
C      ANGLE- ROTATION ANGLE FROM NORTH (CLOCKWISE -> NEG. ANGLE)
C
C*****************************************************************
       DIMENSION SA(4),AZW(4),IR(97),IWR(IOFD),R(4),S1(512),S2(512)
       DIMENSION IXS(4,256),IYS(4,256),IXR(4,256),IYR(4,256),S3(512)
       DIMENSION IXC1(512),IYC1(512),KXC1(512),KYC1(512)
       DIMENSION DISTA(512),DISTB(512),ANGLE(512),BNGLE(512)
       INTEGER*2 ISH(512),LSH(512),JSH(512),NSH(512),KSH(512)
       INTEGER*2 LXFP1(512),LXFP2(512),LYFP1(512),LYFP2(512),MSH(512)
       INTEGER*2 IVEC1(MCP),IVEC2(MCP),IVEC3(MCP),IDR(1024),LDR(1024)
       INTEGER*2 IVEC4(MCP),IWR1(IOFD),IVEC5(MCP)
       INTEGER*2 LFOLD(MCP),NCMP(MCP),IFD(128),IFDA(4,512),NFOLD(MCP)
       INTEGER*2 IVEC6(MCP),IVEC7(MCP),IVEC8(MCP),IVEC9(MCP),IVEC0(MCP)
       INTEGER*2 NS
       CHARACTER*1 Z(0:42)
       DATA Z(0)/'-'/,Z(1)/'1'/,Z(2)/'2'/,Z(3)/'3'/,Z(4)/'4'/,Z(5)/'5'/
       DATA Z(6)/'6'/,Z(7)/'7'/,Z(8)/'8'/,Z(9)/'9'/,Z(10)/'A'/,Z(11)/'B'/
       DATA Z(12)/'C'/,Z(13)/'D'/,Z(14)/'E'/,Z(15)/'F'/,Z(16)/'G'/
       DATA Z(17)/'H'/,Z(18)/'I'/,Z(19)/'J'/,Z(20)/'K'/,Z(21)/'L'/
       DATA Z(22)/'M'/,Z(23)/'N'/,Z(24)/'O'/,Z(25)/'P'/,Z(26)/'Q'/
       DATA Z(27)/'R'/,Z(28)/'S'/,Z(29)/'T'/,Z(30)/'U'/,Z(31)/'V'/
       DATA Z(32)/'W'/,Z(33)/'S'/,Z(34)/'R'/
       DATA Z(35)/'?'/,Z(36)/'@'/,Z(37)/'#'/,Z(38)/'$'/,Z(39)/'%'/
       DATA Z(40)/'*'/,Z(41)/'&'/,Z(42)/'+'/
       PI=3.1415926
       READ(5,20) OFS
       READ(5,10) IFOLD
       READ(5,20) SA(1)
       READ(5,20) AZW(1)
       READ(5,20) SA(2)
       READ(5,20) AZW(2)
       READ(5,20) SA(3)
       READ(5,20) AZW(3)
       READ(5,20) SA(4)
       READ(5,20) AZW(4)
       READ(5,10) ISEED
    10 FORMAT(12X,I8)
    20 FORMAT(5X,F15.2)
C*****************************************************************
C*************** READ 3-D ACQUISITION PARAMETERS *****************
C*****************************************************************
       READ(15,11) IXFP,IYFP,ICT,IDXF,IDYF
    11 FORMAT(1X,5I4)
       XFP=IXFP
       IFOLD6=IOVER*IFOLD
       (IOVER.EQ.1) IFOLD6=MAXNS
       IFLD12=2*IFOLD6
       IXBP=2*IXFP-1
       IYBP=2*IYFP-1
       NTOT=IXBP*IYBP
       NSR=IXFP*IYFP
       MAXNR=MSL
       ILEN=4*IOFD
       OPEN(UNIT=10,ACCESS='DIRECT',FORM='UNFORMATTED',RECL=ILEN)
       OPEN(UNIT=19,ACCESS='SEQUENTIAL',FORM='UNFORMATTED')
       DO 2 I1=1,NTOT
       NCMP(I1)=0
       DO 4 I2=1,IFLD12
       IWR(I2)=0
     4 CONTINUE
       WRITE(10,REC=I1) IWR
     2 CONTINUE
       DXF=IDXF
       DYF=IDYF
       DXB=DXF/2.0
       DYB=DYF/2.0
       LNUM=0
C*****************************************************************
C******************* START MULTIPLE LAYOUT LOOP ******************
C*****************************************************************
       CALL VINIT(NTOT,IVEC0,0)
       DO 12 IC=1,ICT
       READ(15,13) IXFP1,IXFP2,IYFP1,IYFP2,MAXNS,IC1,IC2
    13 FORMAT(1X,7I4)
```

```
      NSH(IC)=MAXNS
      LXFP1(IC)=IXFP1
      LXFP2(IC)=IXFP2
      LYFP1(IC)=IYFP1
      LYFP2(IC)=IYFP2
      IF(IC2.EQ.0) GOTO 14
C*****************************************************************
C****************** READ DEAD RECEIVER LOCATIONS *****************
C*****************************************************************
      READ(15,15) MAXDR
   15 FORMAT(1X,I4)
      CALL VINIT(MAXDR,IDR,0)
      READ(15,15) (IDR(J),J=1,MAXDR)
      DO 16 J=1,MAXDR
      IXDR=IDR(J)/100
      IYDR=IDR(J)-IXDR*100
      IDR(J)=(IYDR-1)*IXFP+IXDR
   16 CONTINUE
   14 CONTINUE
C*****************************************************************
C****************** READ SHOT POINT LOCATIONS ********************
C*****************************************************************
      CALL VINIT(MAXNS,ISH,0)
      READ(15,22) (ISH(J),J=1,MAXNS)
   22 FORMAT(1X,I4)
      WRITE(6,25) (ISH(J),J=1,MAXNS)
   25 FORMAT(5I10)
      DO 27 J=1,MAXNS
      LNUM=LNUM+1
      IX1=ISH(J)/100
      IY1=ISH(J)-IX1*100
      ISH(J)=(IY1-1)*IXFP+IX1
      JSH(LNUM)=ISH(J)
   27 CONTINUE
      WRITE(6,25) (ISH(J),J=1,MAXNS)
C*****************************************************************
C****** ESTIMATE FOLD PER QUADRANT AND UNIFORM OFFSET INTERVAL*******
C*****************************************************************
      IQO=4
      ISRH=MAXNS
      IQDN=IFOLD/IQO
      IF(DXF.LE.DYF) DF1=DXF
      IF(DYF.LT.DXF) DF1=DYF
      OF1=OFS/2.0
      ANUM=OF1/DF1
      OSD=ANUM*DF1
      DD=OSD/IQDN
      OSD2=2.0*OSD
      IXBP1=2*IXFP1-1
      IXBP2=2*IXFP2-1
      IYBP1=2*IYFP1-1
      IYBP2=2*IYFP2-1
C*****************************************************************
C********** START CMP LOOP & LOCATE CMP WITH RESPECT TO EDGES *********
C*****************************************************************
      DO 40 IY=IYBP1,IYBP2
      DO 50 IX=IXBP1,IXBP2
      II=(IY-1)*IXBP+IX
      SPX=(IX+1)/2.0
      SPY=(IY+1)/2.0
      DX1=(IX-IXBP1)*DXB
      DX2=(IX-IXBP2)*DXB
      DY1=(IY-IYBP1)*DYB
      DY2=(IY-IYBP2)*DYB
      R(1)=SQRT(DX1*DX1+DY1*DY1)
      R(2)=SQRT(DX1*DX1+DY2*DY2)
      R(3)=SQRT(DX2*DX2+DY1*DY1)
      R(4)=SQRT(DX2*DX2+DY2*DY2)
      INDX=1
      DO 43 J=1,4
      IF(R(INDX).GT.R(J)) INDX=J
   43 CONTINUE
      NSHEL=R(INDX)/DD+1.0
      IF(NSHEL.GT.IQDN) NSHEL=IQDN
      FSHD=NSHEL*DD
```

```
      LL=0
      CALL VINIT(ISRH,MSH,0)
      DO 55 J=1,MAXNS
      INUM=ISH(J)
      ANUM=INUM
      IYC=INUM/IXFP
      YC=ANUM/XFP
      C=YC-IYC
      IF(C.EQ.0) IXC=INUM/IYC
      IF(C.NE.0) IXC=INUM-IYC*IXFP
      IF(C.NE.0) IYC=IYC+1
      XCD=IXC
      YCD=IYC
      DIFX=IXC-SPX
      DIFY=IYC-SPY
      IXG=SPX-DIFX
      IYG=SPY-DIFY
      IF(IC2.EQ.0) GOTO 57
      JDR=(IYG-1)*IXFP+IXG
C*************** CHECK FOR DEAD STATIONS IN A LAYOUT **********
      CALL REMDR(JDR,IDR,MAXDR,ISAVE)
C***********************************************************
      IF(ISAVE.EQ.0) GOTO 55
   57 CONTINUE
      IF(IXC.LT.IXFP1.OR.IXG.LT.IXFP1.OR.IXC.GT.IXFP2.OR.IXG.GT.
     1 IXFP2) GOTO 55
      IF(IYC.LT.IYFP1.OR.IYG.LT.IYFP1.OR.IYC.GT.IYFP2.OR.IYG.GT.
     1 IYFP2) GOTO 55
      XDIS=(XCD-SPX)*DXF
      YDIS=(YCD-SPY)*DYF
      DR=SQRT(XDIS*XDIS+YDIS*YDIS)
      IF(DR.LE.R(INDX)) IVECO(II)=IVECO(II)+1
      LL=LL+1
      MSH(LL)=ISH(J)
      DISTA(LL)=DR
      IXC1(LL)=IXC
      IYC1(LL)=IYC
C************ DETERMINE AZIMUTH ANGLE OF SHOT *****************
      RAD1=0
      IF(YDIS.NE.0.AND.XDIS.NE.0) RAD1=ATAN2(ABS(YDIS),ABS(XDIS))
      ANG1=(RAD1*180.0)/PI
      IF(ABS(YDIS).EQ.ABS(XDIS)) ANG1=45.
      IF(YDIS.EQ.0..AND.XDIS.GE.0.) ANG1=0.
      IF(YDIS.GT.0..AND.XDIS.EQ.0.) ANG1=90.
      IF(YDIS.EQ.0..AND.XDIS.LT.0.) ANG1=180.
      IF(YDIS.LT.0..AND.XDIS.EQ.0.) ANG1=270.
      ANG2=ANG1
      IF(XDIS.LT.0..AND.YDIS.GT.0.) ANG2=ANG1+90.
      IF(XDIS.LT.0..AND.YDIS.LT.0.) ANG2=ANG1+180.
      IF(XDIS.GT.0..AND.YDIS.LT.0.) ANG2=ANG1+270.
      ANGLE(LL)=ANG2
   55 CONTINUE
      ISRH=LL
      IF(ISRH.LE.IQDN) ISRH=2*IQDN
C***********************************************************
C***************** START QUADRANT LOOP *********************
C***********************************************************
      DO 60 I=1,IQO
      JJ=0
      CALL VINIT(ISRH,LSH,0)
      CALL VINIT(ISRH,KSH,0)
      BEG=SA(I)
      END=SA(I)+AZW(I)
      DO 73 K=1,LL
      KSH(K)=MSH(K)
      DISTB(K)=DISTA(K)
      KXC1(K)=IXC1(K)
      KYC1(K)=IYC1(K)
      BNGLE(K)=ANGLE(K)
   73 CONTINUE
      AMAX=LL
C***********************************************************
C************ START SOURCE-RECEIVER SEARCH LOOP *************
C***********************************************************
      DO 70 J=1,ISRH
```

```
      JJ=JJ+1
      IXS(I,J)=0
      IYS(I,J)=0
      MAX2=0
   75 MAX1=AMAX
      IF(MAX1.EQ.0) GOTO 70
      DT=RAN2(ISEED)
      VA=DT*AMAX+1.0
      KK=VA
      DR=DISTB(KK)
      IF(BNGLE(KK).GE.BEG.AND.BNGLE(KK).LE.END) GOTO 65
      KSH(KK)=0
      CALL SHFST(KSH,DISTB,BNGLE,KXC1,KYC1,MAX1,AMAX)
      GOTO 75
   65 CONTINUE
      IF(JJ.GT.NSHEL) GOTO 67
      DT1=(JJ-1)*DD
      IF(JJ.GT.1) DT1=(JJ-1)*DD+1
      DT2=JJ*DD
      IF(DR.GE.DT1.AND.DR.LE.DT2) GOTO 67
      MAX2=MAX2+1
      IF(MAX2.GT.100) GOTO 70
      GOTO 75
   67 CONTINUE
      LSH(J)=KSH(KK)
      IXS(I,J)=KXC1(KK)
      IYS(I,J)=KYC1(KK)
      KSH(KK)=0
      CALL SHFST(KSH,DISTB,BNGLE,KXC1,KYC1,MAX1,AMAX)
   70 CONTINUE
   60 CONTINUE
      DO 80 I=1,IQO
      DO 90 J=1,ISRH
      IXR(I,J)=0
      IYR(I,J)=0
      DIFFX=IXS(I,J)-SPX
      DIFFY=IYS(I,J)-SPY
      IXR(I,J)=SPX-DIFFX
      IYR(I,J)=SPY-DIFFY
   90 CONTINUE
      READ(10,REC=II) IWR
      M=1
      DO 85 I=1,IQO
      ISTOP=0
      DO 95 J=1,ISRH
      IF(IXS(I,J).LT.IXFP1.OR.IXR(I,J).LT.IXFP1.OR.IXS(I,J).GT.IXFP2
     1.OR.IXR(I,J).GT.IXFP2) GOTO 95
      IF(IYS(I,J).LT.IYFP1.OR.IYR(I,J).LT.IYFP1.OR.IYS(I,J).GT.IYFP2
     1.OR.IYR(I,J).GT.IYFP2) GOTO 95
   93 CONTINUE
      NUMS=(IYS(I,J)-1)*IXFP+IXS(I,J)
      NUMR=(IYR(I,J)-1)*IXFP+IXR(I,J)
      DO 100 K=M,IFOLD6
      IF(IWR(K).EQ.0) GOTO 105
  100 CONTINUE
  105 CONTINUE
      IWR(K)=NUMS
      IWR(K+IFOLD6)=NUMR
      M=K+1
   95 CONTINUE
   85 CONTINUE
      WRITE(10,REC=II) IWR
      NCMP(II)=II
   50 CONTINUE
   40 CONTINUE
   12 CONTINUE
C***************************************************************
C******* START FOLD REDUCTION IN CMP BINS WITH FOLD >IFOLD *********
C***************************************************************
      DO 111 J=1,NTOT
      II=NCMP(J)
      IF(II.EQ.0) GOTO 111
      READ(10,REC=II) IWR
      KK=0
      DO 113 I=1,IFOLD6
```

```
        IF(IWR(I).EQ.0) GOTO 115
        KK=KK+1
113 CONTINUE
115 CONTINUE
        IF(KK.LE.IFOLD) GOTO 122
C********** REDUCE FOLD BY QUADRANTS *******************
        CALL RFOLD(ISEED,IFOLD,KK,IQO,IQDN,IFLD12,IFOLD6,IFDA,IWR,IFD,
     1 IXFP,KFOLD,DD,S1,S2,S3,DXF,DYF)
C*****************************************************************
        DO 120 K=1,KFOLD
        M1=IFD(K)
        IWR1(K)=IWR(M1)
        IWR1(K+IFOLD6)=IWR(M1+IFOLD6)
120 CONTINUE
        DO 121 K=1,KFOLD
        IWR(K)=IWR1(K)
        IWR(K+IFOLD6)=IWR1(K+IFOLD6)
121 CONTINUE
        KK=KFOLD
122 CONTINUE
        LFOLD(II)=KK
        WRITE(10,REC=II) IWR
111 CONTINUE
        DO 123 L=1,NTOT
        N1=NCMP(L)
        IF(N1.EQ.0) GOTO 123
        N2=LFOLD(N1)
        READ(10,REC=N1) IWR
        DO 124 I=1,N2
        NUMS=IWR(I)
        NUMR=IWR(I+IFOLD6)
        DO 125 J=1,MAXNR
        IF(NS(J,NUMS).EQ.0) GOTO 126
125 CONTINUE
126 NS(J,NUMS)=NUMR
124 CONTINUE
123 CONTINUE
        NCT=0
C*****************************************************************
C********** OUTPUT SHOT POINT AND CMP SOURCE-RECEIVER SORTS *********
C*****************************************************************
        DO 145 I=1,NTOT
        N3=NCMP(I)
        IF(N3.EQ.0) GOTO 145
        N4=LFOLD(N3)
        AN3=N3
        XBP=IXBP
        IYC=N3/IXBP
        YC=AN3/XBP
        C=YC-IYC
        IF(C.EQ.0) IXC=N3/IYC
        IF(C.EQ.0) IYC=IYC
        IF(C.NE.0) IXC=N3-IYC*IXBP
        IF(C.NE.0) IYC=IYC+1
        WRITE(20,146) IFOLD,LFOLD(N3),IXC,IYC
146 FORMAT(1X,4I5)
        WRITE(19) N3,N4,IXC,IYC
        NCT=NCT+1
        READ(10,REC=N3) IWR
        WRITE(20,147) (IWR(J),J=1,IFOLD)
        WRITE(20,147) (IWR(J+IFOLD6),J=1,IFOLD)
147 FORMAT(1X,10I5)
145 CONTINUE
        REWIND 19
C*****************************************************************
C*************** PLOT FULL FOLD CMP MAP **************************
C*****************************************************************
        DO 130 J=1,NTOT
        IF(IVECO(J).GE.30.AND.IVECO(J).LT.40) IVECO(J)=35
        IF(IVECO(J).GE.40.AND.IVECO(J).LT.50) IVECO(J)=36
        IF(IVECO(J).GE.50.AND.IVECO(J).LT.60) IVECO(J)=37
        IF(IVECO(J).GE.60.AND.IVECO(J).LT.70) IVECO(J)=38
        IF(IVECO(J).GE.70.AND.IVECO(J).LT.80) IVECO(J)=39
        IF(IVECO(J).GE.80.AND.IVECO(J).LT.90) IVECO(J)=40
        IF(IVECO(J).GE.90.AND.IVECO(J).LT.100) IVECO(J)=41
```

```
      IF(IVECO(J).GE.100) IVECO(J)=42
  130 CONTINUE
      CALL TRANS(NFOLD,IVECO,NTOT)
      WRITE(6,132)
  132 FORMAT(1X,' TOTAL CMP FOLD ')
      WRITE(6,134)
  134 FORMAT(1X,' THE FOLLOWING SYMBOLS APPLY FOR FOLD = OR > 30 ',/,
     1' 30<= ? <40     40<= @ <50     50<= # <60     60<= $ <70 ',/,
     2' 70<= % <80     80<= * <90     90<= & <100    100<= + ')
      CALL PLOT(Z,NFOLD,IXBP,IYBP,NTOT)
C*************************************************************
C*************** PLOT DECIMATED CMP FOLD MAP *****************
C*************************************************************
      WRITE(6,135) OFS
  135 FORMAT(1X,' DECIMATED CMP FOLD FOR MAXIMUM OFFSET OF ',F8.2)
      CALL PLOT(Z,LFOLD,IXBP,IYBP,NTOT)
C*************************************************************
C***************  PLOT AZIMUTH CMP FOLD MAP ******************
C*************************************************************
      CALL VINIT(NTOT,IVEC6,0)
      CALL VINIT(NTOT,IVEC7,0)
      CALL VINIT(NTOT,IVEC8,0)
      CALL VINIT(NTOT,IVEC9,0)
      DO 150  II=1,NCT
      L=0
      J=0
      M=0
      N=0
      READ(19) N3,N4,IXC,IYC
      READ(10,REC=N3) IWR
      CALL AZMUTH(N4,IWR,L,J,M,N,IFOLD6,IFLD12,IXFP,S1,DXF,DYF,IFDA)
      IVEC6(N3)=L
      IVEC7(N3)=J
      IVEC8(N3)=M
      IVEC9(N3)=N
  150 CONTINUE
      DO 160 II=1,IQO
      IF(II.EQ.1) CALL TRANS(LFOLD,IVEC6,NTOT)
      IF(II.EQ.2) CALL TRANS(LFOLD,IVEC7,NTOT)
      IF(II.EQ.3) CALL TRANS(LFOLD,IVEC8,NTOT)
      IF(II.EQ.4) CALL TRANS(LFOLD,IVEC9,NTOT)
      AZ1=(II-1)*90.0
      AZ2=II*90.0-1.0
      WRITE(6,170) AZ1,AZ2
  170 FORMAT(1X,' DECIMATED CMP FOLD FOR AZIMUTH RANGE ',F8.2,' TO ',
     1 F8.2)
      IF(II.EQ.1) CALL PLOT(Z,LFOLD,IXBP,IYBP,NTOT)
      IF(II.EQ.2) CALL PLOT(Z,LFOLD,IXBP,IYBP,NTOT)
      IF(II.EQ.3) CALL PLOT(Z,LFOLD,IXBP,IYBP,NTOT)
      IF(II.EQ.4) CALL PLOT(Z,LFOLD,IXBP,IYBP,NTOT)
  160 CONTINUE
      REWIND 19
C*************************************************************
C*************** PLOT SOURCE-RECEIVER OFFSET FOLD MAP *********
C*************************************************************
      DO 215 JJ=1,IQDN
      CALL VINIT(NTOT,LFOLD,0)
      DO 217 II=1,NCT
      DT1=(JJ-1)*DD
      DT2=JJ*DD
      DT3=2*DT1
      IF(JJ.GT.1) DT3=DT3+1
      DT4=2*DT2
      IF(II.EQ.1) WRITE(6,201) DT3,DT4
  201 FORMAT(1X,' DECIMATED CMP FOLD FOR SOURCE-RECEIVER OFFSET RANGE '
     1 ,F8.2,' TO ',F8.2)
      READ(19) N3,N4,IXC,IYC
      READ(10,REC=N3) IWR
      SPX=(IXC+1.0)/2.0
      SPY=(IYC+1.0)/2.0
      NUMC=(IYC-1)*IXBP+IXC
      NUMF=0
      DO 218 KK=1,N4
      KNUM=IWR(KK)
      CNUM=KNUM
```

```
      LYC=KNUM/IXFP
      YC=CNUM/XFP
      C=YC-LYC
      IF(C.EQ.0.) LXC=KNUM/LYC
      IF(C.EQ.0.) LYC=LYC
      IF(C.NE.0.) LXC=KNUM-LYC*IXFP
      IF(C.NE.0.) LYC=LYC+1
      XCD=LXC
      YCD=LYC
      XDIS=(XCD-SPX)*DXF
      YDIS=(YCD-SPY)*DYF
      DR=SQRT(XDIS*XDIS+YDIS*YDIS)
      IF(DR.GE.DT1.AND.DR.LE.DT2) NUMF=NUMF+1
  218 CONTINUE
      LFOLD(NUMC)=NUMF
  217 CONTINUE
      REWIND 19
      CALL PLOT(Z,LFOLD,IXBP,IYBP,NTOT)
  215 CONTINUE
C***************************************************************
C****************** PLOT SHOT POINT-RECEIVER MAPS ***************
C***************************************************************
      WRITE(6,205)
  205 FORMAT(1X,' DECIMATED SHOT-RECEIVER MAP ')
      ICNT=0
      CALL VINIT(NSR,IVEC5,0)
      DO 230 J=1,ICT
      CALL VINIT(NSR,IVEC1,0)
      CALL VINIT(NSR,IVEC2,0)
      CALL VINIT(IXFP,IVEC3,0)
      INS=NSH(J)
      DO 233 I=1,INS
      ICNT=ICNT+1
      KK=JSH(ICNT)
      IVEC1(KK)=33
      IVEC2(KK)=33
      IVEC5(KK)=33
      LLL=0
      DO 235 II=1,NSR
      IVEC4(II)=0
  235 CONTINUE
      DO 240 LL=1,MAXNR
      IF(NS(LL,KK).EQ.0) GOTO 250
      LLL=LLL+1
      JNUM=NS(LL,KK)
      IVEC4(LLL)=JNUM
      IF(IVEC1(JNUM).EQ.33) GOTO 240
      IVEC1(JNUM)=34
  240 CONTINUE
  250 CONTINUE
      WRITE(6,260) ICNT,KK
  260 FORMAT(1X,2I5)
      KKK=-KK
      WRITE(21,265) KKK,LLL
  265 FORMAT(1X,I10)
      WRITE(21,267) (IVEC4(K),K=1,LLL)
  267 FORMAT(1X,10I5)
      IXFP1=LXFP1(J)
      IXFP2=LXFP2(J)
      IYFP1=LYFP1(J)
      IYFP2=LYFP2(J)
      IDXFP=IXFP2-IXFP1+1
      DO 270 IY=IYFP1,IYFP2
      JJ=0
      DO 280 IX=IXFP1,IXFP2
      JJJ=(IY-1)*IXFP+IX
      JJ=JJ+1
      IVEC3(JJ)=IVEC1(JJJ)
  280 CONTINUE
      WRITE(6,290) (Z(IVEC3(K)),K=1,IDXFP)
  290 FORMAT(1X,60A1)
      CALL VINIT(IXFP,IVEC3,0)
  270 CONTINUE
      CALL VINIT(NSR,IVEC1,0)
  233 CONTINUE
```

```
C*******************************************************************
C************* PLOT SHOT-POINT LOCATIONS FOR EACH LAYOUT ***********
C*******************************************************************
      WRITE(6,275) J
  275 FORMAT(1X,' SHOT LOCATIONS FOR LAYOUT ',I5)
      DO 300 IY=IYFP1,IYFP2
      II=0
      DO 310 IX=IXFP1,IXFP2
      III=(IY-1)*IXFP+IX
      II=II+1
      IVEC3(II)=IVEC2(III)
  310 CONTINUE
      WRITE(6,320) (Z(IVEC3(K)),K=1,IDXFP)
  320 FORMAT(1X,60A1)
      CALL VINIT(IXFP,IVEC3,0)
  300 CONTINUE
  230 CONTINUE
C*******************************************************************
C*************** PLOT ALL SHOT-POINT LOCATIONS *********************
C*******************************************************************
      WRITE(6,330)
  330 FORMAT(1X,' ALL SHOT LOCATIONS FOR ALL LAYOUTS ')
      DO 340 IY=1,IYFP
      LL=0
      DO 350 IX=1,IXFP
      LLL=(IY-1)*IXFP+IX
      LL=LL+1
      IVEC3(LL)=IVEC5(LLL)
  350 CONTINUE
      WRITE(6,360) (Z(IVEC3(K)),K=1,IXFP)
  360 FORMAT(1X,80A1)
      CALL VINIT(IXFP,IVEC3,0)
  340 CONTINUE
      CLOSE(UNIT=10,STATUS='DELETE')
      CLOSE(UNIT=19,STATUS='DELETE')
      REWIND 20
      REWIND 21
C******** DECIMATE COMMON MIDPOINT BIN GATHERS TO IFOLD ***********
      CALL DFOLD(IFOLD,IXFN,IYFN,DELX,DELY,XORIG,YORIG,ANGLE,IWR)
C*******************************************************************
      STOP
      END
C*******************************************************************
      FUNCTION RAN2(ISEED)
C --- RANDOM NUMBER GENERATOR ROUTINE
C --- REFERENCE: NUMERICAL RECIPES: THE ART OF SCIENTIFIC COMPUTING
C --- BY WILLIAM H. PRESS, SAUL A. TEUKOLSKY, BRIAN P. FLANNERY AND
C --- WILLAIM T. VETTERLING, CAMBRIDGE UNIVERSITY PRESS (1986),
C --- P. 197
      DIMENSION IR(97)
      M=714025
      IA=1366
      IC=150889
      RM=1.0/M
      DATA IFF /0/
      IF(ISEED.GE.1.OR.IFF.NE.0) GOTO 20
      IFF=1
      ISEED=MOD(IC-ISEED,M)
      DO 10 J=1,97
      ISEED=MOD(IA*ISEED+IC,M)
      IR(J)=ISEED
   10 CONTINUE
      ISEED=MOD(IA*ISEED+IC,M)
      IY=ISEED
   20 J=1+(97*IY)/M
      IF(J.LE.97.OR.J.GE.1) GOTO 30
      WRITE(6,40)
   40 FORMAT(' J WAS GT 97 OR LT 1 IN RAN2; SET J=48 ')
      J=48
   30 IY=IR(J)
      RAN2=IY*RM
      ISEED=MOD(IA*ISEED+IC,M)
      IR(J)=ISEED
      RETURN
      END
```

```
C****************************************************************
      SUBROUTINE VINIT(N,IX,IVAL)
C --- PROGRAM INITIALIZES A VECTOR
      INTEGER*2 IX(N)
      DO 10 I=1,N
      IX(I)=IVAL
   10 CONTINUE
      RETURN
      END
C****************************************************************
      SUBROUTINE SHFST(KSH,DISTB,BNGLE,KXC1,KYC1,MAX1,AMAX)
C --- PROGRAM TO RESORT A VECTOR SET
      DIMENSION DISTB(MAX1),BNGLE(MAX1),KXC1(MAX1),KYC1(MAX1)
      INTEGER*2 KSH(MAX1)
      J=0
      DO 10 I=1,MAX1
      IF(KSH(I).EQ.0) GOTO 10
      J=J+1
      KSH(J)=KSH(I)
      DISTB(J)=DISTB(I)
      BNGLE(J)=BNGLE(I)
      KXC1(J)=KXC1(I)
      KYC1(J)=KYC1(I)
   10 CONTINUE
      AMAX=J
      RETURN
      END
C****************************************************************
      SUBROUTINE PLOT(Z,LFOLD,IXBP,IYBP,NTOT)
C --- PROGRAM TO PLOT THE CMP FOLD MAPS
      CHARACTER*1 Z(0:34)
      INTEGER*2 LFOLD(NTOT)
      WRITE(6,10)
   10 FORMAT(1X,' CMP FOLD MAP ')
      DO 40 IY=1,IYBP
      NN=(IY-1)*IXBP+1
      MM=(IY-1)*IXBP+IXBP
      WRITE(6,50) (Z(LFOLD(I)),I=NN,MM)
   50 FORMAT(1X,120A1)
   40 CONTINUE
      RETURN
      END
C****************************************************************
      SUBROUTINE RFOLD(ISEED,IFOLD,KK,IQO,IQDN,IFLD12,IFOLD6,IFDA,
     1 IWR,IFD,IXFP,KFOLD,DD,S1,S2,S3,DXF,DYF)
C --- PROGRAM TO REDUCE FOLD IN A CMP BIN BY QUADRANTS AND OFFSETS
      DIMENSION IWR(IFLD12),S1(KK),S2(KK),S3(KK)
      INTEGER*2 IFDA(4,512),IFD(IFOLD)
      XFP=IXFP
      L=0
      J=0
      M=0
      N=0
      CALL AZMUTH(KK,IWR,L,J,M,N,IFOLD6,IFLD12,IXFP,S1,DXF,DYF,IFDA)
      MM=0
      DO 60 II=1,IQO
      IF(II.EQ.1) KKK=L
      IF(II.EQ.2) KKK=J
      IF(II.EQ.3) KKK=M
      IF(II.EQ.4) KKK=N
      IF(KKK.EQ.0) GOTO 60
      IF(KKK.LE.IQDN) GOTO 90
      IND1=IFDA(II,1)
      DO 63 I=1,KKK
      IND2=IFDA(II,I)
      IF(S1(IND2).GT.S1(IND1)) IND1=IND2
   63 CONTINUE
      LSHEL=S1(IND1)/DD+1.0
      IF(LSHEL.GT.IQDN) LSHEL=IQDN
      DO 65 I=1,KKK
      IND2=IFDA(II,I)
      S2(I)=S1(IND2)
      S3(I)=S2(I)
   65 CONTINUE
```

```
      JJJ=0
      DO 70 JJ=1,IQDN
      LL=0
      JJJ=JJJ+1
      DO 73 I=1,KKK
      IF(S3(I).EQ.-2.0) GOTO 73
      S3(I)=S2(I)
   73 CONTINUE
      MAX1=KKK
      LLL=0
   75 CONTINUE
      IF(MAX1.EQ.0) GOTO 70
      NN=RAN2(ISEED)*KKK+1.0
      LLL=LLL+1
      IF(LLL.GT.100) GOTO 70
      IF(S3(NN).EQ.-1.0.OR.S3(NN).EQ.-2.0) GOTO 75
      DR=S3(NN)
      IF(JJJ.GT.LSHEL) GOTO 85
      DT1=(JJJ-1)*DD
      IF(JJJ.GT.1) DT1=(JJJ-1)*DD+1
      DT2=JJJ*DD
      IF(DR.GE.DT1.AND.DR.LE.DT2) GOTO 85
      S3(NN)=-1.0
      MAX1=MAX1-1
      LL=LL+1
      GOTO 75
   85 CONTINUE
      MM=MM+1
      IFD(MM)=IFDA(II,NN)
      IFDA(II,NN)=0
      S3(NN)=-2.0
   70 CONTINUE
      GOTO 60
   90 CONTINUE
      DO 100 JJ=1,KKK
      MM=MM+1
      IFD(MM)=IFDA(II,JJ)
      IFDA(II,JJ)=0
  100 CONTINUE
   60 CONTINUE
      IF(MM.EQ.IFOLD) GOTO 110
      DO 120 II=1,IQO
      IF(II.EQ.1) KKK=L
      IF(II.EQ.2) KKK=J
      IF(II.EQ.3) KKK=M
      IF(II.EQ.4) KKK=N
      IF(KKK.EQ.0) GOTO 120
      IF(KKK.LE.IQDN) GOTO 120
      DO 130 JJ=1,KKK
      IF(IFDA(II,JJ).EQ.0) GOTO 130
      MM=MM+1
      IFD(MM)=IFDA(II,JJ)
      IF(MM.EQ.IFOLD) GOTO 110
  130 CONTINUE
  120 CONTINUE
  110 CONTINUE
      KFOLD=MM
      RETURN
      END
C*****************************************************
      SUBROUTINE AZMUTH(KK,IHR,L,J,M,N,IFOLD6,IFLD12,IXFP,S1,DXF,DYF,
     1 IFDA)
C --- PROGRAM TO RESORTS FOLD BY QUADRANTS
      DIMENSION IHR(IFLD12),S1(KK)
      INTEGER*2 IFDA(4,512)
      XFP=IXFP
      DO 10 K=1,KK
      NUMS1=IHR(K)
      NUMR1=IHR(K+IFOLD6)
      ANUMS=NUMS1
      IYS=NUMS1/IXFP
      YS=ANUMS/XFP
      S=YS-IYS
      IF(S.EQ.0.) IXS=NUMS1/IYS
      IF(S.EQ.0.) IYS=IYS
```

```
      IF(S.NE.0.) IXS=NUMS1-IYS*IXFP
      IF(S.NE.0.) IYS=IYS+1
      XS=IXS
      YS=IYS
      ANUMR=NUMR1
      IYR=NUMR1/IXFP
      YR=ANUMR/XFP
      R=YR-IYR
      IF(R.EQ.0.) IXR=NUMR1/IYR
      IF(R.EQ.0.) IYR=IYR
      IF(R.NE.0.) IXR=NUMR1-IYR*IXFP
      IF(R.NE.0.) IYR=IYR+1
      XR=IXR
      YR=IYR
      XC=(XS+XR)/2.0
      YC=(YS+YR)/2.0
      XD=XS-XC
      YD=YS-YC
      XD=XD*DXF
      YD=YD*DYF
      S1(K)=SQRT(XD*XD+YD*YD)
      IF(XD.GE.0..AND.YD.EQ.0..OR.XD.GT.0..AND.YD.GT.0.) GOTO 20
      IF(XD.EQ.0..AND.YD.GT.0..OR.XD.LT.0..AND.YD.GT.0.) GOTO 30
      IF(XD.LT.0..AND.YD.EQ.0..OR.XD.LT.0..AND.YD.LT.0.) GOTO 40
      IF(XD.EQ.0..AND.YD.LT.0..OR.XD.GT.0..AND.YD.LT.0.) GOTO 50
   20 CONTINUE
      L=L+1
      IFDA(1,L)=0
      IFDA(1,L)=K
      GOTO 10
   30 CONTINUE
      J=J+1
      IFDA(2,J)=0
      IFDA(2,J)=K
      GOTO 10
   40 M=M+1
      IFDA(3,M)=0
      IFDA(3,M)=K
      GOTO 10
   50 CONTINUE
      N=N+1
      IFDA(4,N)=0
      IFDA(4,N)=K
   10 CONTINUE
      RETURN
      END
C**********************************************************************
      SUBROUTINE TRANS(LFOLD,IWORK,NTOT)
C --- PROGRAM TO TRANSFER A VECTOR TO ANOTHER VECTOR
      INTEGER*2 LFOLD(NTOT),IWORK(NTOT)
      CALL VINIT(NTOT,LFOLD,0)
      DO 10 I=1,NTOT
      LFOLD(I)=IWORK(I)
   10 CONTINUE
      RETURN
      END
C**********************************************************************
      SUBROUTINE REMDR(JDR,IDR,MAXDR,ISAVE)
C --- PROGRAM TO CHECK FOR DEAD STATION LOCATIONS
      INTEGER*2 IDR(MAXDR)
      ISAVE=1
      DO 10 I=1,MAXDR
      IF(JDR.NE.IDR(I)) GOTO 10
      ISAVE=0
      GOTO 20
   10 CONTINUE
   20 CONTINUE
      RETURN
      END
C**********************************************************************
      SUBROUTINE DFOLD(IFOLD,IXFN,IYFN,DELX,DELY,XORIG,YORIG,
     1 ANGLE,IW2)
C --- PROGRAM TO DECIMATE COMMON MIDPOINT BINS TO A MAXIMUM
C --- DESIRED FOLD (IFOLD). ADD MAGIN AND MAGOUT SUBROUTINES
C --- TO READ SOCIETY OF EXPLORATION GEOPHYSICS TAPE FORMAT Y
```

```
C --- RECORDS OF LENGTH LN.
C --- REFERENCE: K. M. BARRY, D. A. CAVERS AND C. W. KNEALE,
C --- RECOMMENDED STANDARDS FOR DIGITAL TAPE FORMATS, GEOPHYSICS
C --- VOL 40, NO. 2 (APRIL 1975), P. 334-352.
C
      DIMENSION X(3000),IW1(4),IW2(IFOLD)
      INTEGER*4 JX(3000)
      INTEGER*2 IX(6000)
      EQUIVALENCE (X(1),JX(1),IX(1))
      PI=3.1415926
      ANGLE=ANGLE*PI/180.0
      IXCN=2*IXFN-1
      IYCN=2*IYFN-1
      NTR=IXCN*IYCN
      OPEN(UNIT=10,ACCESS='DIRECT',FORM='UNFORMATTED',RECL=2000)
      OPEN(UNIT=19,ACCESS='DIRECT',FORM='UNFORMATTED',RECL=16)
      DO 10 J=1,NTR
      READ(20,20) MFOLD,JFOLD,IXC,IYC
   20 FORMAT(1X,4I5)
      NUM=(IYC-1)*IXCN+IXC
      IW1(1)=NUM
      IW1(2)=JFOLD
      WRITE(19,REC=NUM) IW1
      READ(20,30) (IW2(I),I=1,IFOLD)
      READ(20,30) (IW2(I+IFOLD),I=1,IFOLD)
   30 FORMAT(1X,10I5)
      WRITE(10,REC=NUM) IW2
   10 CONTINUE
      IFLAG=0
      IXF=1
      IYF=1
      L=0
   40 IFLAG=IFLAG+1
      CALL MAGIN(X,IX,JX,LN)
      IF(LN.EQ.-1) GOTO 80
      IF(IFLAG.GT.2) GOTO 50
      CALL MAGOUT(X,IX,JX,LN)
      GOTO 40
   50 CONTINUE
      IXB=JX(46)
      IYB=JX(47)
      IF(IX(36).LT.0) ISC=-IX(36)
      IF(IX(36).GE.0) ISC=1/IX(36)
      IXS=JX(19)/ISC
      IYS=JX(20)/ISC
      XCS=IXS
      YCS=IYS
      CALL BINCAL(XCS,YCS,XORIG,YORIG,ANGLE,DELX,DELY,M,N,2)
      NUMS=(N-1)*IXFN+M
      L=L+1
      NUM=(IYB-1)*IXCN+IXB
      IF(IXF.NE.IXB.OR.IYF.NE.IYB) L=1
      IXF=IXB
      IYF=IYB
      IF(L.EQ.1) READ(19,REC=NUM) IW1
      IF(L.EQ.1) READ(10,REC=NUM) IW2
      JFOLD=IW1(2)
      DO 60 I=1,JFOLD
      IF(NUMS.EQ.IW2(I)) GOTO 70
   60 CONTINUE
      GOTO 40
   70 CONTINUE
      CALL MAGOUT(X,IX,JX,LN)
      GOTO 40
   80 CONTINUE
      CLOSE(UNIT=10,STATUS='DELETE')
      CLOSE(UNIT=19,STATUS='DELETE')
      STOP
      END
C     ************************************************************
      SUBROUTINE BINCAL(XCOR,YCOR,XORIG,YORIG,ANGLE,DELX,DELY,M,N,IC)
C
C     COMPUTE X,Y BIN LOCATIONS FROM SURVEY COORDINATES
C
      VAL=1.5
```

```
IF(IC.EQ.2) VAL=1.75
M=((XCOR-XORIG)*COS(ANGLE)+(YCOR-YORIG)*SIN(ANGLE))/DELX+VAL
N=((XORIG-XCOR)*SIN(ANGLE)+(YCOR-YORIG)*COS(ANGLE))/DELY+VAL
RETURN
END
```

That which is claimed is:

1. A method of seismic prospecting comprising the steps of:
   - (a) producing a plurality of seismic traces respectively corresponding to a plurality of seismic source-receiver pairs which define an areal array of source positions and receiver positions, wherein each source-receiver pair includes a source position and a receiver position and wherein any one seismic trace is produced by a seismic receiver located at the receiver position of the corresponding source-receiver pair in response to the reflection of at least one seismic wave transmitted into the subsurface of the earth by a seismic source located at the source position of the corresponding source-receiver pair;
   - (b) selecting a fold number $n_3$, where $n_1$ is an integer of a least 2;
   - (c) selecting a common midpoint (CMP) of a set of source-receiver pairs which define at least a portion of said areal array, wherein the source position and receiver position of each source-receiver pair of said set has said CMP as the midpoint therebetween and wherein the number of source-receiver pairs in said set is greater than $n_1$;
   - (d) segregating said areal array into $n_2$ angularly separated sections defined by at least one imaginary boundary passing through said CMP, where $n_2$ is an integer and $2 \leq n_2 \leq n_1$;
   - (e) segregating at least a portion of said areal array into $n_3$ shells defined by at least $n_3$ imaginary closed and nonintersecting boundaries which surround said CMP, such that the innermost shell is defined by the boundary closest to said CMP and such that each other shell is defined between adjacent shell boundaries, where $n_3$ is an integer and $2 \leq n_3 \leq n_1$;
   - (f) selecting $n_1$ source positions or $n_1$ receiver positions in said areal array which correspond to $n_1$ source-receiver pairs of said set of source-receiver pairs having said CMP as their midpoint, said selecting of source positions and receiver positions being performed such that each shell and each section includes at least one selected source position or receiver position therein to the extent that each said section or shell has at least one source position or receiver position therein which corresponds to a source-receiver pair of said set of source-receiver pairs having said CMP as their midpoint;
   - (g) summing the seismic traces which respectively correspond to the $n_1$ source-receiver pairs of step (f) to yield a stacked trace.

2. A method as recited in claim 1, wherein each shell has $n_2$ portions such that each such portion lies in a different section, and wherein in step (f) said selecting of source positions or receiver positions is performed such that each shell portion of each shell includes at least one selected source position or receiver position therein to the extent that each such shell portion of each shell has at least one source position or receiver position therein which corresponds to a source-receiver pair of said set of source-receiver pairs having said CMP as their midpoint.

3. A method as recited in claim 2 further comprising repeating steps (c)–(g) with respect to each of a number of additional common midpoints of corresponding additional sets of source-receiver pairs.

4. A method as recited in claim 3 further comprising selecting an arrangement of source positions and receiver positions for said areal array before step (a).

5. A method as recited in claim 4 wherein each of said boundaries which define said shells are generally circular in shape.

6. A method as recited in claim 5 wherein $n_2 \times n_3 = n_1$.

7. A method as recited in claim 6 wherein said at least one boundary defining said sections comprises two generally perpendicular lines intersecting at said CMP so as to define four sections which can be denoted as quadrants.

8. A method as recited in claim 7 wherein said areal array is in the shape of a parallelogram.

* * * * *

UNITED STATES PATENT AND TRADEMARK OFFICE
CERTIFICATE OF CORRECTION

PATENT NO. : 4,933,912

DATED : June 12, 1990

INVENTOR(S) : Joseph G. Gallagher

It is certified that error appears in the above-identified patent and that said Letters Patent is hereby corrected as shown below:

Column 39, claim 1, line 23, "$n_3$" should be --- $n_1$ ---.

Signed and Sealed this

Third Day of September, 1991

Attest:

HARRY F. MANBECK, JR.

*Attesting Officer*

*Commissioner of Patents and Trademarks*